US008654365B2

(12) United States Patent
Nagata

(10) Patent No.: US 8,654,365 B2
(45) Date of Patent: Feb. 18, 2014

(54) IMAGE DATA PROCESSING SYSTEM

(75) Inventor: Yoshinori Nagata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/613,822

(22) Filed: Sep. 13, 2012

(65) Prior Publication Data

US 2013/0070273 A1    Mar. 21, 2013

(30) Foreign Application Priority Data

Sep. 20, 2011  (JP) .................................. 2011-205173

(51) Int. Cl.
*G06F 3/12* (2006.01)
(52) U.S. Cl.
USPC ........................................ 358/1.13; 358/1.15
(58) Field of Classification Search
USPC .............................................. 358/1.13, 1.15
See application file for complete search history.

(56) References Cited

U.S. PATENT DOCUMENTS

| 5,909,602 A * | 6/1999 | Nakai et al. ...................... 399/8 |
| 2006/0085676 A1 | 4/2006 | Kobayashi et al. |
| 2007/0268517 A1 | 11/2007 | Koarai |

FOREIGN PATENT DOCUMENTS

| JP | 09-238215 | 9/1997 |
| JP | 2004-206585 | 7/2004 |
| JP | 2006-115222 | 4/2006 |
| JP | 2007-282136 | 10/2007 |

* cited by examiner

*Primary Examiner* — King Poon
*Assistant Examiner* — Andrew H Lam
(74) *Attorney, Agent, or Firm* — Edwards Wildman Palmer LLP; George W. Neuner

(57) ABSTRACT

The present invention includes a control apparatus that (i) receives, from a multifunction peripheral, information indicative of image process content selected by the user, (ii) detects, in correspondence with image processing function information stored in advance, an image process section that can carry out an image process, and (iii) causes the detected image process section to carry out the image process. This arrangement makes it possible to easily use, at the multifunction peripheral, an image processing function that can be performed by an image processing apparatus.

5 Claims, 16 Drawing Sheets

FIG. 4

| | | | | 12b |
|---|---|---|---|---|
| SET COPYING CONDITION AND PRESS "START COPY" | | | | |
| NUMBER OF COPIES | 1 | BLANK SHEET REMOVAL | ON | |
| SHEET SIZE | AUTOMATIC | SKEW CORRECTION | ON | |
| COLOR MODE | AUTOMATIC | AUTOMATIC ROTATION | ON | |
| ZOOMING | 100% | TRANSLATION | ON | |
| DENSITY | AUTOMATIC | RED-EYE CORRECTION | OFF | |
| | | | | START COPY |

FIG. 5

| IMAGE PROCESS (COPYING SETTING ITEM) | IMAGE PROCESS CONTENT (COPYING PROCESS CONTENT) |
|---|---|
| EQUAL-RATE ENLARGING/REDUCING (ZOOMING) PROCESS | enlarges/reduces the document image in the longitudinal and lateral directions at an equal zooming rate, and copies the document image |
| DENSITY CORRECTION PROCESS | corrects the density of the document image and copies it |
| BLANK SHEET REMOVAL PROCESS | removes a blank page from multiple pages of the document image, and copies the rest |
| SKEW CORRECTION PROCESS | corrects skewing of the document image, and copies it |
| AUTOMATIC ROTATION PROCESS | corrects the orientation of the document image by the unit of 90°, and copies it |
| TRANSLATION PROCESS | translates the document, and copies the translation result |
| RED-EYE CORRECTION PROCESS | corrects the color of the eyes of people and animals in the document image, and copies it |
| COLOR CORRECTION PROCESS | corrects the colors of the document image, and copies it |
| INDEPENDENT ENLARGING/REDUCING (ZOOMING) PROCESS | enlarges/reduces the document image in the longitudinal and lateral directions at respective different zooming rates, and copies the document image |
| SHARPNESS PROCESS | adjusts the image quality for copying, and copies the document image |
| BINDING MARGIN SETTING PROCESS | set a binding margin to a desired width, and copies the document image |
| FRAME REMOVAL PROCESS | erases the edge of the document, and copies the document image |
| CENTERING PROCESS | copies the document image at the center of a sheet |
| TWO-PAGE COPYING PROCESS | copies a book |
| DISTRIBUTION DESTINATION COPYING PROCESS | includes an addressee's name, and copies the document image |
| MULTI-SHOT PROCESS | lays out multiple pages of a document on a single sheet, and copies the document image |
| TRIMMING PROCESS | copies only a specified part of the document image |
| MASKING PROCESS | erases a specified part of the document image, and copies the rest |
| MOVING PROCESS | moves the document image to a desired position, and copies it |
| MERGING PROCESS | merges multiple document images, and copies the merged document images |
| BLACK/WHITE REVERSION PROCESS | reverses the negative and positive, and copies the document image |
| SHADING PROCESS | shades/unshades the document image, and copies it |
| HATCHING PROCESS | hatches the document image, and copies it |
| OUTLINING PROCESS | borders around the image, and copies the document image |
| TILTING PROCESS | tilts the image, and copies the document image |
| MIRROR IMAGE PROCESS | reverses the image as if it is reflected in a mirror, and copies the document image |
| REPEAT COPYING PROCESS | copies multiple images of a single document on a single sheet |
| 2-IN-1 COPYING PROCESS | copies a pair of document images on a single sheet |
| DATING/COPYING PROCESS | dates the document image, and copies it |
| CENTER MARK PROCESS | provides the document image with a center mark, and copies it |
| ENLARGING/DIVIDING OUTPUT PROCESS | enlarges the document, divides the document image, and copies the divided images on respective multiple sheets |

IMAGE DATA PROCESSING SYSTEM

This Nonprovisional application claims priority under 35 U.S.C. §119 on Patent Application No. 2011-205173 filed in Japan on Sep. 20, 2011, the entire contents of which are hereby incorporated by reference.

TECHNICAL FIELD

The present invention relates to an image data processing system in which (i) a multifunction peripheral and an image processing apparatus are communicably connected to each other over a communications network and (ii) the multifunction peripheral and the image processing apparatus process image data in cooperation with each other.

BACKGROUND ART

There has been a copying system in which (i) a multifunction peripheral obtains image data by reading a document and then transmits the image data to an image processing apparatus, (ii) the image processing apparatus carries out an image process with respect to the image data and then transmits the image data back to the multifunction peripheral, and (iii) the multifunction peripheral prints an image represented by the image data transmitted back from the image processing apparatus.

Patent Literature 1, for example, discloses a technique in which a control section of a digital copying machine determines, in correspondence with a type of an image process that a user has instructed the digital copying machine to carry out, whether the image process is to be carried out by the digital copying machine itself or by a host computer. Specifically, this technique is arranged as follows: In the case where the image process is to be carried out by the digital copying machine itself, the digital copying machine (i) transmits image data to an image process section included therein, (ii) causes the image process section to carry out the image process, and (iii) forms an image on the basis of image data obtained by the image process carried out by the image process section. In the case where the image process is to be carried out by a host computer, (i) the digital copying machine supplies image data of a document to the host computer, (ii) the host computer carries out the image process with respect to the image data, and (iii) the digital copying machine forms an image on the basis of image data obtained by the image process.

CITATION LIST

Patent Literature 1

Japanese Patent Application Publication, Tokukaihei, No. 9-238215 A (Publication Date: Sep. 9, 1997)

SUMMARY OF INVENTION

Technical Problem

The above technique of Patent Literature 1, however, causes a control section of the digital copying machine to determine whether an image process is to be carried out by the digital copying machine itself or by a host computer. This technique thus requires the digital copying machine to store registration information on both (i) image processing functions that can be performed by the digital copying machine and (ii) image processing functions that can be performed by the host computer.

Thus, such registration information stored in the digital copying machine needs to be updated each time there has been a change (for example, update, addition, and elimination) to such image processing functions that can be performed by the host computer. Such a need has been causing serious trouble.

The present invention has been accomplished in view of the above problem. It is an object of the present invention to, in an image data processing system in which (i) a multifunction peripheral and an image processing apparatus are communicably connected to each other and (ii) the multifunction peripheral and the image processing apparatus process image data in cooperation with each other, easily use, at the multifunction peripheral, an image processing function that can be performed by the image processing apparatus.

Solution to Problem

In order to solve the above problem, an image data processing system of the present invention includes: a multifunction peripheral including: an image scanning section for reading a document to obtain image data of the document; an internal image process section for carrying out an image process with respect to image data; and an image data output process section for carrying out a process of outputting image data; and one or more image processing apparatuses each including: an external image process section for carrying out an image process with respect to image data, the multifunction peripheral and the one or more image processing apparatuses being communicably connected to one another over a communications network, the image data processing system carrying out a complex process during which: the image scanning section obtains image data of a document; at least one of the internal image process section and the external image process section carries out an image process with respect to the image data obtained by the image scanning section; and the image data output process section carries out a process of outputting the image data that has been subjected to the image process by the at least one of the internal image process section and the external image process section, the image data processing system further including: a control apparatus communicably connected to the multifunction peripheral over the communications network, the control apparatus including: a complex process control section for controlling respective operations of the image scanning section, the at least one of the internal image process section and the external image process section, and the image data output process section during the complex process, the multifunction peripheral further including: an instruction input section for accepting, from a user, (i) a first instruction to select content of the image process to be carried out with respect to the image data during the complex process and (ii) a second instruction to start the complex process, the control apparatus further including: a storage section storing image processing function information including (i) information on content of an image process that the internal image process section is capable of carrying out and (ii) information on content of an image process that the external image process section is capable of carrying out, the multifunction peripheral, upon receipt of the first instruction and the second instruction from the user, transmitting, to the control apparatus, (i) process content information indicative of the selected image process content and (ii) a request to start the complex process, the complex process control section, upon receipt of the request and the process content information from the multifunction peripheral, (i) causing the image scanning section to obtain image data of a document, (ii) on a basis of the process content information and the image processing function information, detecting, from among the internal image process section and the respective external image process sections of the one or more image processing apparatuses, an image process section that is capable of carrying out a first image process corresponding to the image process content selected by the user, and (iii) causing the detected image process section to carry out the first image process with respect to the image data obtained by the image scanning section.

Advantageous Effects of Invention

According to the above arrangement, the multifunction peripheral, upon acceptance, from the user, of (i) an instruction to select content of an image process and (ii) an instruction to start a complex process, transmits, to the control apparatus, (i) process content information indicative of the selected image process content and (ii) a request to start a complex process. Further, the control apparatus includes a storage section that stores image processing function information including (i) information on the content of an image process that the internal image process section is capable of carrying out and (ii) information on the content of an image process that the external image process section is capable of carrying out. The control apparatus, upon receipt of the complex process start request and the process content information from the multifunction peripheral, (i) causes the mage scanning section to obtain image data of a document, (ii) on the basis of the process content information and the image processing function information, detects, from among the internal image process section and the respective external image process sections, an image process section that is capable of carrying out an image process corresponding to the image process content selected by the user, (iii) causes the detected image process section to carry out, with respect to the image data obtained by the image scanning section, the image process corresponding to the image process content selected by the user, and (iv) causes the image data output process section to carry out a process of outputting the image data that has been subjected to the image process. With this arrangement, even in the case where, for instance, there has been a change (for example, update, addition, and elimination) to the image processing functions that can be performed by the image processing apparatus, such a change merely requires updating the image processing function information stored in the control apparatus, and does not require updating information registered in the multifunction peripheral. The above arrangement thus makes it possible to easily use, at the multifunction peripheral, an up-to-date image processing function that can be performed by the image processing apparatus.

BRIEF DESCRIPTION OF DRAWINGS

FIG. 4 is an explanatory diagram illustrating an example of an operation screen for a copier mode which operation screen is displayed by a display section of a multifunction peripheral included in the image data processing system illustrated in FIG. 1.

FIG. 5 is an explanatory diagram showing example image processes that can be carried out by the image data processing system illustrated in FIG. 1.

DESCRIPTION OF EMBODIMENTS

Embodiment 1

The description below deals with an embodiment of the present invention.

(1-1. Overall Configuration of Image Data Processing System 1)

Figure 1:
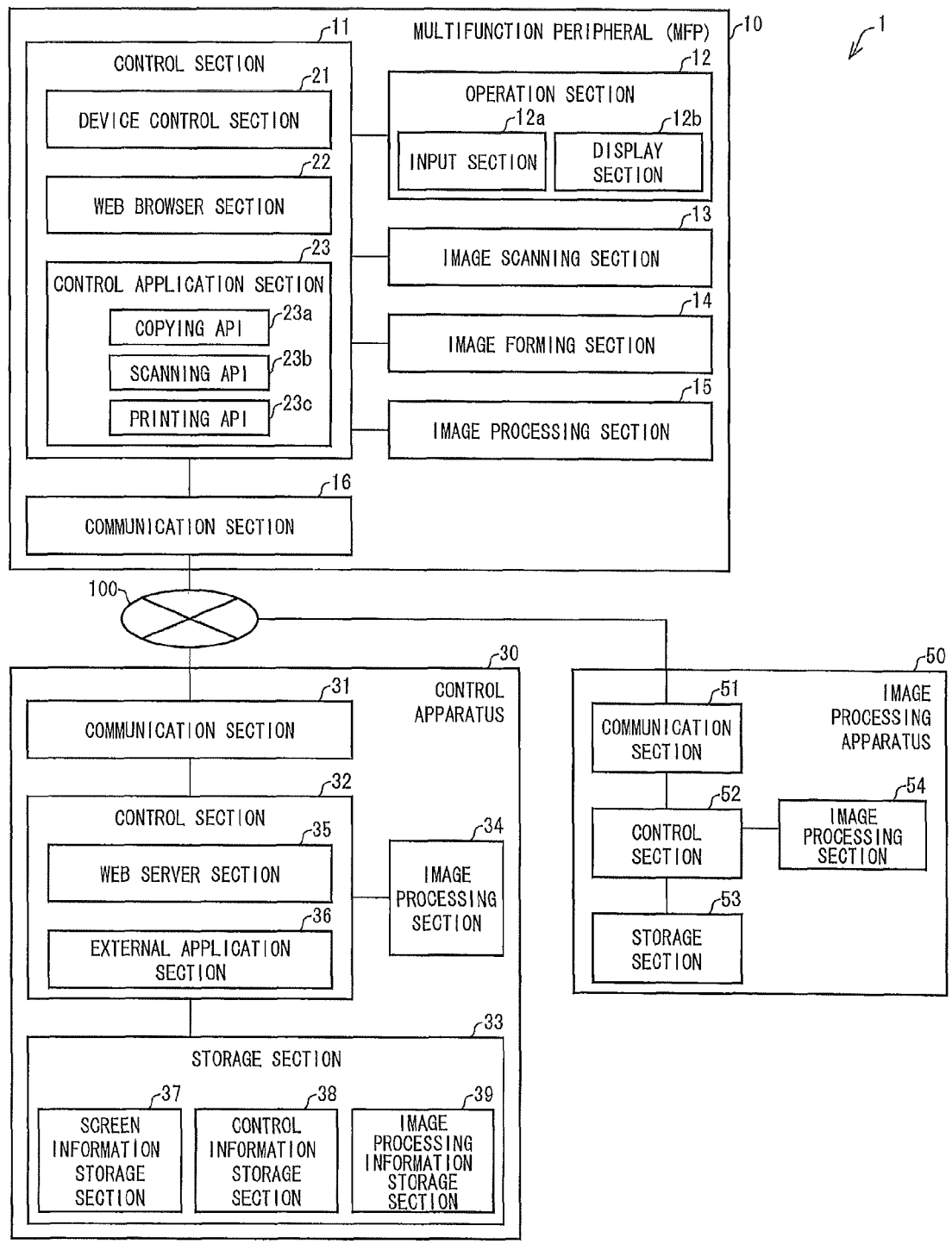
FIG. 1 is an explanatory diagram illustrating a configuration of an image data processing system of an embodiment of the present invention.

FIG. 1 is an explanatory diagram illustrating a configuration of an image data processing system 1 of the present embodiment. As illustrated in FIG. 1, the image data processing system 1 includes: a multifunction peripheral (MFP) 10; a control apparatus 30; and an image processing apparatus 50, which are all communicably connected to one another over a communications network 100.

The image data processing system 1 may include a plurality of multifunction peripherals 10. The number of image processing apparatuses 50 included in the image data processing system 1 is also not particularly limited, and may be one (1) or may be two or more.

The communications network 100 may be a cable network such as IEEE1394, USB, power-line carrier, cable TV line, telephone line, ADSL line, and serial cable. The communications network 100 may alternatively be a wireless network such as infrared radiation (for example, IrDA or remote control), Bluetooth (registered trademark), 802.11 wireless network, HDR, mobile telephone network, satellite line, and digital terrestrial network.

The present embodiment is arranged such that the multifunction peripheral 10 and the control apparatus 30 communicate with each other in accordance with HTTP (hypertext transfer protocol). HTTP is a protocol used for communication (for example, a request and transmission of a web page) between a web server and a web browser.

The present embodiment may be arranged such that at least one of the multifunction peripheral 10, the control apparatus 30, and the image processing apparatus 50 is connected to the communications network 100 with a firewall provided therebetween.

(1-2. Arrangement of Multifunction Peripheral 10)

The multifunction peripheral 10 is a digital or analog multifunction peripheral that (i) receives HTML control information from the control apparatus 30 in accordance with HTTP and that (ii) performs its various functions on the basis of the control information received. The above various functions include, for example, a scanning function, a printing function, a copying function, a facsimile transmitting/receiving function, and a communicating function.

The multifunction peripheral 10 includes: a control section 11; an operation section 12; an image scanning section 13; an image forming section (image data output process section) 14; an image process section (internal image process section) 15; and a communication section 16. The control section 11 includes: a device control section 21; a web browser section 22; and a control application section 23. The control application section 23 includes: a copying API (application interface) 23a; a scanning API 23b; and a printing API 23c.

The operation section 12 is a user interface that (i) notifies the user of various information and that (ii) accepts an instruction input from the user. Specifically, the operation section 12 includes: an input section (instruction input section) 12a including various input keys; and a display section 12b for displaying information to be presented to the user. The display section 12b is not particularly limited in terms of configuration, and may be, for example, a liquid crystal display (LCD), a plasma display, or an organic EL display. The operation section 12 may alternatively be a touch panel that integrally includes the input section 12a and the display section 12b.

The image scanning section 13 includes a scanner and a document carrying section for carrying a document to a reading position of the scanner. The image scanning section 13 performs a scanning function of (i) scanning, for example, a character and image printed on a document and thus (ii) preparing image data thereof.

The image forming section (image data output process section) 14 prints, on a recording material (recording sheet) such as a sheet, an image represented by image data. The image forming section 14 performs (i) a copying function of printing an image represented by image data obtained by the image scanning section 13 and (ii) a printer function of printing an image represented by image data inputted from an external device. The image forming section 14 of the present embodiment is an electrophotographic printing apparatus including, for example, a photoreceptor drum, a charging device, an exposure device, a developing device, a transfer device, a fixing device, and a sheet tray. The image forming section 14 is, however, not particularly limited in terms of configuration, and may be, for example, an inkjet printing apparatus.

The image process section (internal image process section) 15 carries out, with respect to (i) image data obtained by the image scanning section 13 or (ii) image data inputted from an external device, a predetermined image process (for example, a shading correction process, a tone correction process, a color correction process, a color conversion process, an enlarging/reducing (zooming) process, or a density correction process).

The communication section 16 is a communication interface for communication with another apparatus such as the control apparatus 30 and the image processing apparatus 50 over the communications network 100. The communication section 16 of the present embodiment, as described above, communicates with the control apparatus 30 in accordance with HTTP.

The control section 11 is a computer device including, for example, (i) an arithmetic process section (not shown) such as a CPU and a dedicated processor and (ii) storage means (not shown) such as a RAM, a ROM, and a HDD. The control section 11 (i) reads various information and programs for carrying out various controls, the various information and programs being stored in the storage means, and (ii) executes the programs to perform functions of the device control section 21, the web browser section 22, and the control application section 23.

The web browser section 22 (i) operates in accordance with software of a widely used web browser and (ii) communicates, via the communication section 16, with a web server section 35 included in the control apparatus 30. Further, the web browser section 22 (i) causes the display section 12b to display an operation screen (UI content) received from the control apparatus 30 and (ii) accepts the user's operation input to the input section 12a.

The control application section 23 carries out a process according to a web application operating on a web server. The control application section 23, in the case where there is a need to control any of the various functions (for example, a copying function) of the multifunction peripheral 10, transmits to the device control section 21a control command for controlling that function.

Specifically, the control application section 23 includes: a copying API 23a; a scanning API 23b; and a printing API 23c.

The copying API 23a receives, from the control apparatus 30, (i) data of copying condition settings (for example, a document size setting, a sheet size setting, a two-sided printing setting, and a post-processing setting) and (ii) a copying start command (printing command). Upon the above receipt, the copying API 23a controls the device control section 21 so that the multifunction peripheral 10 carries out a copying process (specifically, a document reading process and a printing process) on the basis of the copying condition settings.

The scanning API 23b receives, from the control apparatus 30, (i) data of scanning condition settings (for example, a resolution setting and a monochrome/color setting), (ii) setting information on a destination (or storage location) of scanned document data, and (iii) a scanning start command. Upon the above receipt, the scanning API 23b reads, on the basis of the scanning condition settings, a document placed on a scanner platen or a document carried by an automatic document feeding device. The scanning API 23b then controls the device control section 21 so that the multifunction peripheral 10 carries out a process of transmitting the scanned image data to the above destination (or storing the scanned image data at the storage location).

The printing API 23c receives, from the control apparatus 30, (i) data of printing condition settings (for example, a recording paper size setting and a paper output tray setting), (ii) printing image data, and (iii) a printing start command. Upon the above receipt, the printing API 23c controls the device control section 21 so that the multifunction peripheral 10 carries out, on the basis of the printing condition settings, a process of printing an image represented by the printing image data.

The device control section 21 controls various functions of the multifunction peripheral 10. Specifically, the device control section 21 controls respective operations of individual sections such as the image scanning section 13, the image forming section 14, the image process section 15, the communication section 16, and the operation section 12. The device control section 21, for instance, controls the operation of the image scanning section 13 to cause the image scanning section 13 to (i) read a document and thus (ii) obtain image data of that document. The device control section 21 controls the operation of the image forming section 14 to cause the image forming section 14 to form (output), on a recording material, an image represented by image data. The device control section 21 controls the operation of the image process section 15 to cause the image process section 15 to carry out an image process with respect to image data. The device control section 21 controls the operation of the communication section 16 to cause the communication section 16 to communicate with another apparatus.

The device control section 21 has a unique operation mode and a cooperative operation mode. In the unique operation mode, which is a mode unique to the multifunction peripheral 10, the device control section 21 controls the respective operations of the individual sections of the multifunction peripheral 10 on the basis of a program that is stored in the multifunction peripheral 10 in advance. The unique operation mode is a normal mode adopted by a conventional multifunction peripheral, and is thus not described here in detail.

The device control section 21, when it has been instructed to be set to the cooperative operation mode, activates the web browser section 22 to cause the web browser section 22 to carry out a process according to a preset URL (in the present embodiment, a URL for requesting the web server section 35 of the control apparatus 30 to transmit an initial information display screen). The device control section 21, when in the cooperative operation mode, accepts a control command from the control application section 23, and carries out a control according to that control command. The present embodiment carries out a copying process in the cooperative operation mode.

(1-3. Arrangement of Control Apparatus 30)

The control apparatus (image processing apparatus) 30, as illustrated in FIG. 1, includes: a communication section 31; a control section 32; a storage section 33; and an image process section (external image process section) 34. The control section 32 includes: a web server section 35; and an external application section 36. The storage section 33 includes: a screen information storage section 37; a control information storage section 38; and an image processing information storage section 39.

The communication section 31 communicates with another apparatus connected to the control apparatus 30 over the communications network 100. The communication section 31, in the present embodiment, communicates with the multifunction peripheral 10 in accordance with the HTTP communications protocol.

The control section (complex process control section) 32 is a computer device including, for example, (i) an arithmetic process section (not shown) such as a CPU and a dedicated processor and (ii) storage means (not shown) such as a RAM, a ROM, and a HDD. The control section 32 (i) reads various information and programs for carrying out various controls, the various information and programs being stored in the storage means, and (ii) executes the programs to perform, for example, functions of the web server section 35 and the external application section 36. The control section 32 further has (i) the function of controlling a device function of the multifunction peripheral 10 and (ii) the function of instructing the image processing apparatus 50 to carry out an image process.

The web server section 35 operates in accordance with software of a widely used web server. A web server is software that provides the function of a server included in the WWW (World Wide Web), which is an information system on the Internet. The web server section 35 has the function of (i) receiving a request (in the present embodiment, an HTTP request) from the multifunction peripheral 10 via the communication section 31 and (ii) transmitting, back to the multifunction peripheral 10 via the communication section 31, data (for example, a file, image data, print data, and/or control information) that responds to the above request.

The external application section (complex process control section) 36 operates in accordance with a predetermined web application in response an instruction from the web server section 35. In other words, the external application section 36 operates in accordance with any of various web applications each operating on a web server.

For instance, in the case where the request (HTTP request) from the multifunction peripheral 10 is a request for transmission of a display screen, the external application section 36 operates in accordance with a display screen transmitting application. Specifically, the external application section 36 (i) reads, from the screen information storage section 37, HTML data of the display screen of which the transmission is requested, and (ii) transmits the HTML data to the web server section 35.

In the case where the request from the multifunction peripheral 10 is a request for transmission of print data, the external application section 36 operates in accordance with a printing application. Specifically, the external application section 36 (i) obtains, from a folder with a name indicated by the transmission request, print data with a file name specified in the transmission request, and (ii) transmits the print data to the web server section 35.

In the case where the request from the multifunction peripheral 10 is a request for image processing of image data, the external application section 36 operates in accordance with an image processing application. Specifically, in the case where the image processing request is a request for the image process section 34 of the control apparatus 30 to carry out an image process, the external application section 36 (i) transmits image data as a processing target to the image process section 34, (ii) causes the image process section 34 to carry out the image process responding to the image processing request, and (iii) causes the image data, which has been subjected to the image process, to be transmitted to the web server section 35. In the case where the image processing request is a request for an image process section of another image processing apparatus (for example, an image process section 54 of the image processing apparatus 50) to carry out an image process, the external application section 36 (i) transmits image data as a processing target to that image process section, (ii) causes that image process section to carry out the image process responding to the image processing request, (iii) receives the image data that has been subjected to the image process, and (iv) transmits that image data to the web server section 35. In the case where the external application section 36 causes an image process section of another image processing apparatus to carry out an image process, the external application section 36 may alternately cause the multifunction peripheral 10 to transmit image data as a processing target to such another image processing apparatus.

The image process section (external image process section) 34 carries out, with respect to image data, a predetermined image process (for example, a blank sheet removal process, a skew correction process, or an automatic rotation process; all described below).

The screen information storage section 37 stores information on various screens that are displayed by the display section 12b of the multifunction peripheral 10. The control information storage section 38 stores control information for controlling the individual sections of the multifunction peripheral 10. The image processing information storage section 39 stores an image processing information table (image processing function information; image processing list information). For each of the image processes that can be carried out by respective image process sections of the individual apparatuses (for example, (i) the image process section [internal image process section] 15 of the multifunction peripheral 10, (ii) the image process section [external image processing apparatus] 34 of the control apparatus 30, and (iii) the image process section [external image processing apparatus] 54 of the image processing apparatus 50) connected to one another over the communications network 100, the image processing information table associates (a) identification information (image processing ID) indicative of the type (or content) of the image process with (b) identification information (hardware ID) indicative of an apparatus that can carry out that image process.

Figure 2:
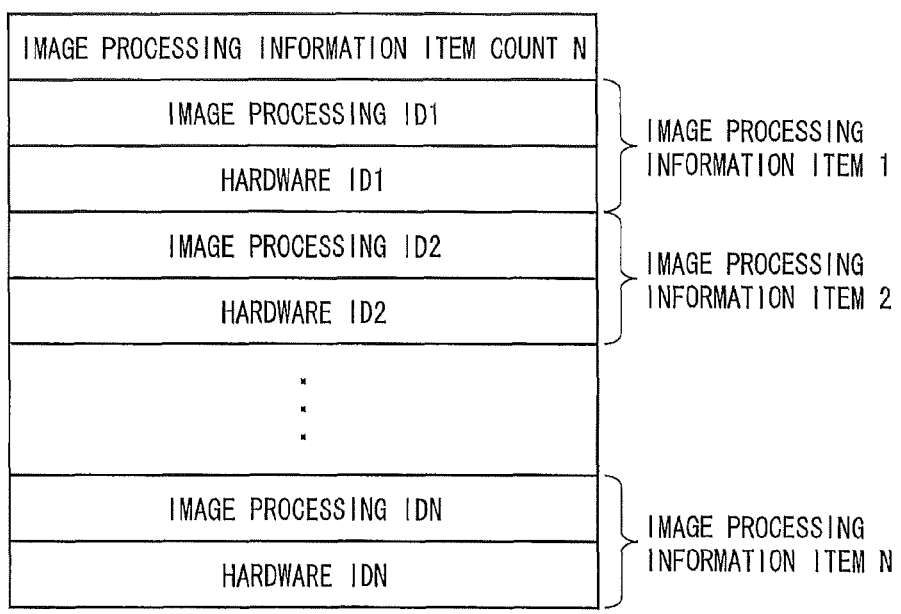
FIG. 2 is an explanatory diagram illustrating an example data structure for an image processing information table stored in a control apparatus included in the image data processing system illustrated in FIG. 1.

FIG. 2 is an explanatory diagram illustrating an example data structure of an image processing information table stored in the image processing information storage section 39. The example image processing information table illustrated in FIG. 2 includes (i) an image processing information item count N (where N is an integer of 1 or greater) and (ii) N image processing information items (image processing information items 1, 2, . . . , N). The image processing information items each include (i) identification information (image processing ID) indicative of the type of an image process and (ii) identification information (hardware ID) indicative of an apparatus that can carry out that image process.

(1-4. Arrangement of Image Processing Apparatus 50)

The image processing apparatus 50 includes: a communication section 51; a control section 52; a storage section 53; and an image process section 54.

The communication section 51 communicates with another apparatus connected to the image processing apparatus 50 over the communications network 100.

The control section 52 is a computer device including, for example, (i) an arithmetic process section (not shown) such as a CPU and a dedicated processor and (ii) storage means (not shown) such as a RAM, a ROM, and a HDD. The control section 52 (i) reads various information and programs for carrying out various controls, the various information and programs being stored in the storage means, and (ii) executes the programs to control respective operations of the individual sections of the image processing apparatus 50.

The storage section 53 stores information such as (i) image data that is processed by the image processing apparatus 50 and (ii) various control information.

The image process section (external image process section) 54 carries out, with respect to image data, a predetermined image process (for example, a translation process or a red-eye correction process).

(1-5. Operation of Image Data Processing System 1)

The image data processing system 1 is arranged such that (i) the image scanning section 13 obtains image data of a document, (ii) at least one of the image process section 15, the image process section 34, and the image process section 54 carries out an image process with respect to the image data obtained by the image scanning section 13, and (iii) the image data output process section of the multifunction peripheral 10 has the function of carrying out a complex process, that is, a process of outputting the image data that has been subjected to an image process carried out by the at least one of the image process sections.

The description of the present embodiment deals mainly with a case in which the above output process is a printing process (copying process) carried out by the image forming section 14 with respect to image data. The above output process is, however, not limited to such a process. The output process may be, for instance, a process carried out by the communication section (image data output process section) 16 to transmit (by facsimile [FAX] or electronic mail, for example), to another apparatus, the image data that has been subjected to an image process carried out by the at least one of the image process sections. The output process may alternatively be a process carried out by the device control section (image data output process section) 21 of the multifunction peripheral 10 to cause either an image storage section (not shown) included in the multifunction peripheral 10 or an image storage section (not shown) communicably connected to the multifunction peripheral 10 to store (file) the image data that has been subjected to an image process carried out by the at least one of the image process sections. The output process may further alternatively be a process carried out by the device control section (image data output process section) 21 of the multifunction peripheral 10 to cause the display section 12b included in the multifunction peripheral 10 to display an image represented by the image data that has been subjected to an image process carried out by the at least one of the image process sections.

Figure 3:
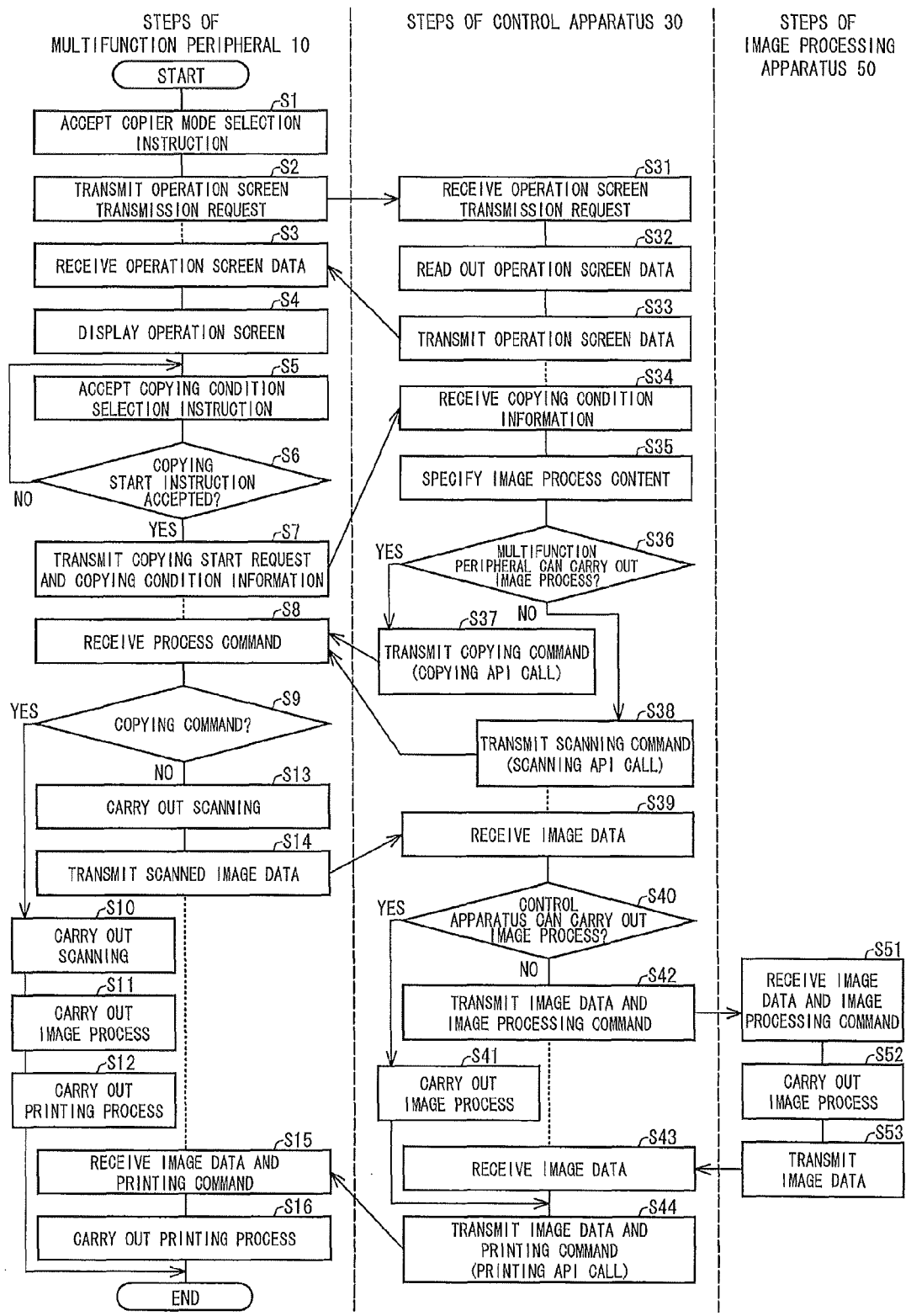
FIG. 3 is a flowchart illustrating a flow of steps carried out by the image data processing system illustrated in FIG. 1.

FIG. 3 is a flowchart illustrating a flow of the copying process (complex process) carried out by the image data processing system 1.

The web browser section 22 of the multifunction peripheral 10, upon acceptance of an instruction, from the user via the operation section 12, to select a copier mode (complex process mode) (S1), transmits, to the control apparatus 30 via the communication section 16, a request for transmission of an operation screen for the copier mode (S2).

The web server section 35 of the control apparatus 30, upon receipt of the operation screen transmission request from the multifunction peripheral 10 (S31), (i) reads, from the screen information storage section 37, data of the operation screen responding to the transmission request (that is, HTML data of the operation screen) (S32), and (ii) transmits the operation screen data to the multifunction peripheral 10 via the communication section 31 (S33).

The web browser section 22 of the multifunction peripheral 10, upon receipt of the operation screen data from the control apparatus 30 (S3), controls the display section 12b to cause the display section 12b to display the operation screen represented by the operation screen data (S4).

FIG. 4 is an explanatory diagram illustrating an example of the copier mode operation screen displayed by the display section 12b. This example operation screen illustrated in FIG. 4 allows the user to change settings for the individual items of "NUMBER OF COPIES", "SHEET SIZE", "COLOR MODE", "ZOOMING", "DENSITY", "BLANK SHEET REMOVAL", "SKEW CORRECTION", "AUTOMATIC ROTATION", "TRANSLATION", and "RED-EYE CORRECTION".

"NUMBER OF COPIES" is an item that sets the number of sheets on each of which an image represented by image data is to be printed. This item is set to 1 by default, and can be changed by the user as necessary to any other number.

"SHEET SIZE" is an item that sets the size of a sheet on which an image represented by image data is to be printed. This item is set by default to an automatic setting mode, which sets the sheet size automatically in correspondence with the result of detecting a document size. This item can be changed by the user as necessary to any particular sheet size. The image scanning section 13 includes a document size detecting sensor for detecting a document size. In the automatic setting mode, the image process section 15 sets the sheet size (that is, the size of a recording material) in correspondence with the result of detection of a document size by the image scanning section 13. For instance, the image process section 15 sets the sheet size to (i) the document size or to (ii) the size among selectable sheet sizes that is the closest to the document size. The image process section 15 supplies image data to the image forming section 14, which then prints, on a sheet having the sheet size set as above, an image represented by the image data. The image process section 15 may, as necessary, first (i) carry out an image process with respect to image data so that the image data is suitable for the sheet size and then (ii) supply that image data to the image forming section 14.

"COLOR MODE" is an item that sets whether to print a monochrome image or a color image. This item is set by default to an automatic setting mode, which allows the image process section 15 to automatically set, in correspondence with image data obtained by reading a document, whether to print a monochrome image or a color image. This item can be changed by the user at will as necessary. In the automatic setting mode, the image process section 15 (i) determines, in correspondence with image data scanned by the image scanning section 13, whether the document is a monochrome document or a color document, and then (ii) sets, in correspondence with the result of the determination, whether to print a monochrome image or a color image. For instance, the image process section 15 selects (i) monochrome printing in the case of a monochrome document and (ii) color printing in the case of a color document.

"ZOOMING" is a mode that sets the zooming for the size of a copying image (printing image) with respect to the size of an image of a document. This mode is set by default to 100% so that a copying image is to be printed with a size equal to that of an image of a document. This mode can be changed by the user as necessary to any desired value.

"DENSITY" is a mode that sets the density for a copying image (printing image) to be printed. This mode is set by default to an automatic setting mode, which automatically sets the density for a copying image (printing image) in correspondence with the density of an image obtained by reading a document. In the automatic setting mode, the image process section 15 (i) determines the density of an image of a document in correspondence with image data scanned by the image scanning section 13, and (ii) sets the density for a copying image (printing image) in correspondence with the result of the determination to be able to faithfully reproduce the image of the document on a recording material.

"BLANK SHEET REMOVAL" is an item that sets whether to carry out a blank sheet removal process, which is a process that when a plurality of documents are to be copied, (i) determines whether the plurality of documents include a blank document and (ii) if the plurality of documents include a blank document, removes any such blank document before a copying process. The blank sheet removal is set by default to ON (that is, the blank sheet removal process is to be carried out), which can be changed by the user as necessary to OFF (that is, the blank sheet removal process is not to be carried out). The present embodiment is arranged such that the above blank sheet removal process is carried out by use of the image process section 34 of the control apparatus 30. The determination of whether a blank document is included is not particularly limited in terms of method, and may be made by any of various methods that have been publicly known. For instance, the image process section 34, for each page of image data of a document, (i) detects the number of pixels in an image portion on that page (that is, the number of pixels in the region other than the region having the color of a page background) and (ii) extracts, as a blank page, any page for which the detected number of pixels is not greater than a predetermined value. The present embodiment thus (i) does not carry out a copying process (printing process) for any blank page and (ii) carries out a copying process for any page other than a blank page.

"SKEW CORRECTION" is an item that sets (i) whether to determine whether an image of a document which image is represented by image data obtained by reading the document is skewed with respect to a predetermined direction and, (ii) if the image of the document is skewed with respect to the predetermined direction, whether to carry out a skew correction process to correct that skew. The skew correction is set by default to ON (that is, the skew correction process is to be carried out), which can be changed by the user as necessary to OFF (that is, the skew correction process is not to be carried out). The present embodiment is arranged such that the above skew correction process is carried out by use of the image process section 34 of the control apparatus 30. The detection of a skew is not particularly limited in terms of method, and may be carried out by any of various methods that have been publicly known.

"AUTOMATIC ROTATION" is an item that sets (i) whether to determine whether an image of a document which image is represented by image data obtained by reading the document has a first orientation (changeable by the unit of 90°) that is different from a second orientation of the image data and, (ii) if the first orientation is different from the second orientation, whether to carry out an automatic rotation process, which is a process for rotating the image of the document in the image data by the unit of 90° so that the first orientation is identical to the second orientation. The automatic rotation is set by default to ON (that is, the automatic rotation process is to be carried out), which can be changed by the user as necessary to OFF (that is, the automatic rotation process is not to be carried out). The present embodiment is arranged such that the above automatic rotation process is carried out by use of the image process section 34 of the control apparatus 30. The automatic rotation process is not particularly limited in terms of method, and may be carried out by any of various methods that have been publicly known. For instance, the image process section 34, for each page of image data of a document, (i) creates four pieces of image data that are so rotated from one another as to be oriented at respective angles of 0°, 90°, 180°, and 270° and (ii) carries out an OCR process (character recognition process) with respect to each piece of the image data. The image process section 34 then (i) determines, as a correct orientation for the document, the direction corresponding to the rotation angle for which the number of recognized characters (that is, the number of characters for each of which the value indicative of the degree of matching with a character registered in dictionary data for the OCR process is equal to or greater than a predetermine value) is the greatest and (ii) rotates the image data of the document so that the orientation of the image data is identical to the above correct orientation.

"TRANSLATION" is an item that sets whether to carry out a translation process (translating/copying process), which is a process for (i) translating the language of characters in a document into a predetermined language and (ii) printing an image in which the characters in the document are replaced by the translation results. The translation process is set by default to OFF (that is, the translation process is not to be carried out), which can be changed by the user as necessary to ON (that is, the translation process is to be carried out). The present embodiment is arranged such that the above translation process is carried out by use of the image process section 54 of the image processing apparatus 50. The translation process is not particularly limited in terms of method, and may be carried out by any of various methods that have been publicly known. For instance, the image process section 54 (i) carries out an OCR process with respect to image data of a document, (ii) translates, with use of machine translation software, sentences recognized as a result of the OCR process, and (iii) creates image data in which the original sentences included in the image data of the document are replaced by respective sentences corresponding to the translation results. The image forming section 14 of the multifunction peripheral 10 then prints an image represented by the image data including the above sentences corresponding to the translation results. The present embodiment may be arranged such that another apparatus carries out at least one of (i) the process of extracting sentences through an OCR process, (ii) the process of translating the extracted sentences, and (iii) the process of replacing sentences in the image data. For instance, the translation process may be carried out with use of a free translation service or the like provided on the Web. Further, either or both of the OCR process and the replacement process may be carried out by the multifunction peripheral 10 or the control apparatus 30.

"RED-EYE CORRECTION" is a mode that sets, in the case where there has occurred a red-eye phenomenon in a photograph (that is, a phenomenon in which the eyes of a person or animal in a photograph are red) included in a document, whether to carry out a red-eye correction process, which is a process for correcting such a red-eye phenomenon. The red-eye correction is set by default to OFF (that is, the red-eye correction process is not to be carried out), which can be changed by the user as necessary to ON (that is, the red-eye correction process is to be carried out). The present embodiment is arranged such that the above red-eye correction process is carried out by use of the image process section 54 of the image processing apparatus 50. The red-eye correction process is not particularly limited in terms of method, and may be carried out by any of various methods that have been publicly known.

After S4, the web browser section 22 accepts an instruction (that is, an instruction to set individual setting items), from the user through the operation screen displayed in S4, to select a copying condition (that is, the content of an image process) (S5). The web browser section 22 then determines whether to have accepted a copying start instruction (operation of a "start copy" button; an instruction to start a complex process) (S6). In the case where the web browser section 22 has determined that it has not accepted a copying start instruction, the steps S5 and S6 are repeated.

In the case where the web browser section 22 has determined in S6 that it has accepted a copying start instruction, the web browser section 22 (i) creates copying condition information (process content information) indicative of a currently set copying condition (image process content) and (ii) transmits a copying start request (that is, a request for start of a complex process) and the copying condition information to the control apparatus 30 via the communication section 16 (S7).

The web server section 35 of the control apparatus 30, upon receipt of the copying condition information from the multifunction peripheral 10 (S34), transmits the received copying condition information to the external application section 36. The external application section 36 specifies, on the basis of the copying condition information, the content of an image process to be carried out with respect to the image data (S35).

The external application section 36 determines, with reference to an image processing information table stored in the image processing information storage section 39, whether the image process specified in S35 can be carried out by the image process section 15 of the multifunction peripheral 10 (S36).

In the case where the external application section 36 has determined in S36 that the image process can be carried out by the image process section 15 of the multifunction peripheral 10, the external application section 36 creates a copying command (copying API call; process command) and transmits the copying command to the web server section 35. The web server section 35 then transmits this copying command to the multifunction peripheral 10 via the communication section 31 (S37). This copying command includes a control command for causing (i) the image scanning section 13 to carry out a process of reading a document, (ii) the image process section 15 to carry out an image process under a copying condition set by the user, and (iii) the image forming section 14 to carry out a process of printing an image represented by the image data that has been subjected to the image process.

In the case where the external application section 36 has determined in S36 that the image process cannot be carried out by the image process section 15 of the multifunction peripheral 10, the external application section 36 creates a scanning command (scanning API call; process command) and transmits the scanning command to the web server section 35. The web server section 35 then transmits this scanning command to the multifunction peripheral 10 via the communication section 31 (S38). This scanning command includes a control command for causing the image scanning section 13 to (i) carry out a process of reading a document and to (ii) transmit the scanned image data to a predetermined destination (in the present embodiment, the control apparatus 30).

The web browser section 22 of the multifunction peripheral 10, upon receipt of the process command (that is, a copying command or a scanning command) from the control apparatus 30 (S8), transmits the received process command to the control application section 23. The control application section 23 then determines whether the received process command is a copying command (S9).

In the case where the control application section 23 has determined in S9 that the process command is a copying command, the control application section 23 (i) activates the copying API 23*a*, (ii) creates a control command for causing a copying process responding to the copying command to be carried out, and (iii) transmits the control command to the device control section 21. The device control section 21, in accordance with this control command, controls (i) the image scanning section 13 to cause the image scanning section 13 to carry out a process of reading a document (S10), (ii) the image process section 15 to cause the image process section 15 to carry out, with respect to image data scanned by the image scanning section 13, the image process under the copying condition set by the user (S11), and (iii) the image forming section 14 to cause the image forming section 14 to carry out a process of printing an image represented by the image data that has been subjected to the image process by the image process section 15 (S12), whereby the flow of the copying process ends.

In the case where the control application section 23 has determined in S9 that the process command is not a copying command (that is, the process command is a scanning command), the control application section 23 (i) activates the scanning API 23*b*, (ii) creates a control command for causing a scanning process responding to the scanning command to be carried out, and (iii) transmits the control command to the device control section 21. The device control section 21, in accordance with this control command, controls (i) the image scanning section 13 to cause the image scanning section 13 to carry out a process of reading a document (S13) and (ii) the communication section 16 to cause the communication section 16 to transmit the scanned image data to a destination (in the present embodiment, the control apparatus 30) corresponding to the scanning command (S14).

The external application section 36 of the control apparatus 30, upon receipt of the image data from the multifunction peripheral 10 (S39), determines, with reference to the image processing information table stored in the image processing information storage section 39, whether the image process specified in S35 can be carried out by the image process section 34 of the control apparatus 30 (S40).

In the case where the external application section 36 has determined in S40 that the image process can be carried out by the image process section 34, the external application section 36 causes the image process section 34 to carry out the image process specified in S35 (S41), and then transmits, to the web server section 35, (i) the image data that has been subjected to the image process and (ii) a printing command (printing API call) for causing the image forming section 14 to carry out a process of printing the image data. The web server section 35 transmits the image data and the printing command to the multifunction peripheral 10 via the communication section 31 (S44).

In the case where the external application section 36 has determined in S40 that the image process cannot be carried out by the image process section 34, the external application section 36 transmits, to the web server section 35, (i) the image data received in S39 and (ii) an image processing command for causing the image process section 54 of the image processing apparatus 50 to carry out the image process specified in S35. The web server section 35 transmits the image data and the image processing command to the image processing apparatus 50.

The control section 52 of the image processing apparatus 50, upon receipt of the image data and the image processing command from the control apparatus 30 (S51), (i) causes the image process responding to the image processing command to be carried out with respect to the image data (S52) and (ii) transmits, to the control apparatus 30 via the communication section 51, the image data that has been subjected to the image process (S53).

The external application section 36 of the control apparatus 30, upon receipt, from the image processing apparatus 50, of the image data that has been subjected to the image process (S43), (i) creates a printing command (printing API call) for causing the image forming section 14 to carry out a process of printing the image data and then (ii) transmits the printing command to the web server section 35. The web server section 35 transmits, to the multifunction peripheral 10 via the communication section 31, (i) the image data that has been subjected to the image process and (ii) the printing command both received from the image processing apparatus 50 (S44).

The web browser section 22 of the multifunction peripheral 10, upon receipt of the image data and the printing command from the control apparatus 30 (S15), transmits the image data and the printing command to the control application section 23. The control application section 23 then (i) activates the printing API 23c, (ii) creates a control command for causing the printing process responding to the printing command to be carried out, and (iii) transmits the control command to the device control section 21. The device control section 21, in accordance with this control command, controls the image forming section 14 to cause the image forming section 14 to carry out the process of printing an image represented by the image data received in S15 (S16), whereby the flow of the copying process ends.

As described above, the image data processing system 1 of the present embodiment is arranged as follows: The multifunction peripheral 10, upon acceptance of a copying condition selection instruction (image process content selection instruction) and a copying start instruction (complex process start instruction) from the user, transmits, to the control apparatus 30, copying condition information indicative of the selected copying condition. The control apparatus 30 includes an image processing information storage section 39 that stores an image processing information table associating (i) the image process section 15 of the multifunction peripheral 10, the image process section 34 of the control apparatus 30, and the image process section 54 of the image processing apparatus 50 with (ii) the content of image processes that can be carried out by each of the above image process sections. The control apparatus 30, with reference to the image processing information table, specifies an apparatus that is to carry out an image process corresponding to the copying condition information received from the multifunction peripheral 10. The control apparatus 30 then (i) causes an image process section of the specified apparatus to carry out the image process and (ii) causes the multifunction peripheral 10 to print the image data that has been subjected to the image process.

With the above arrangement, even in the case where, for instance, there has been a change (for example, update, addition, and elimination) to the image processing functions that can be performed by the control apparatus 30 or the image processing apparatus 50, such a change merely requires updating the image processing information table stored in the control apparatus 30, and does not require updating information registered in the multifunction peripheral 10. The above arrangement thus makes it possible to easily use, at the multifunction peripheral 10, an up-to-date image processing function that can be performed by the image data processing system 1. Further, the above arrangement (i) causes the control apparatus 30 to automatically determine which apparatus is to carry out an image process and thus (ii) eliminates the need for the user to select an apparatus that is to carry out an image process. The above arrangement consequently makes it possible to provide an image data processing system that is highly flexible and user-friendly.

Figure 6:
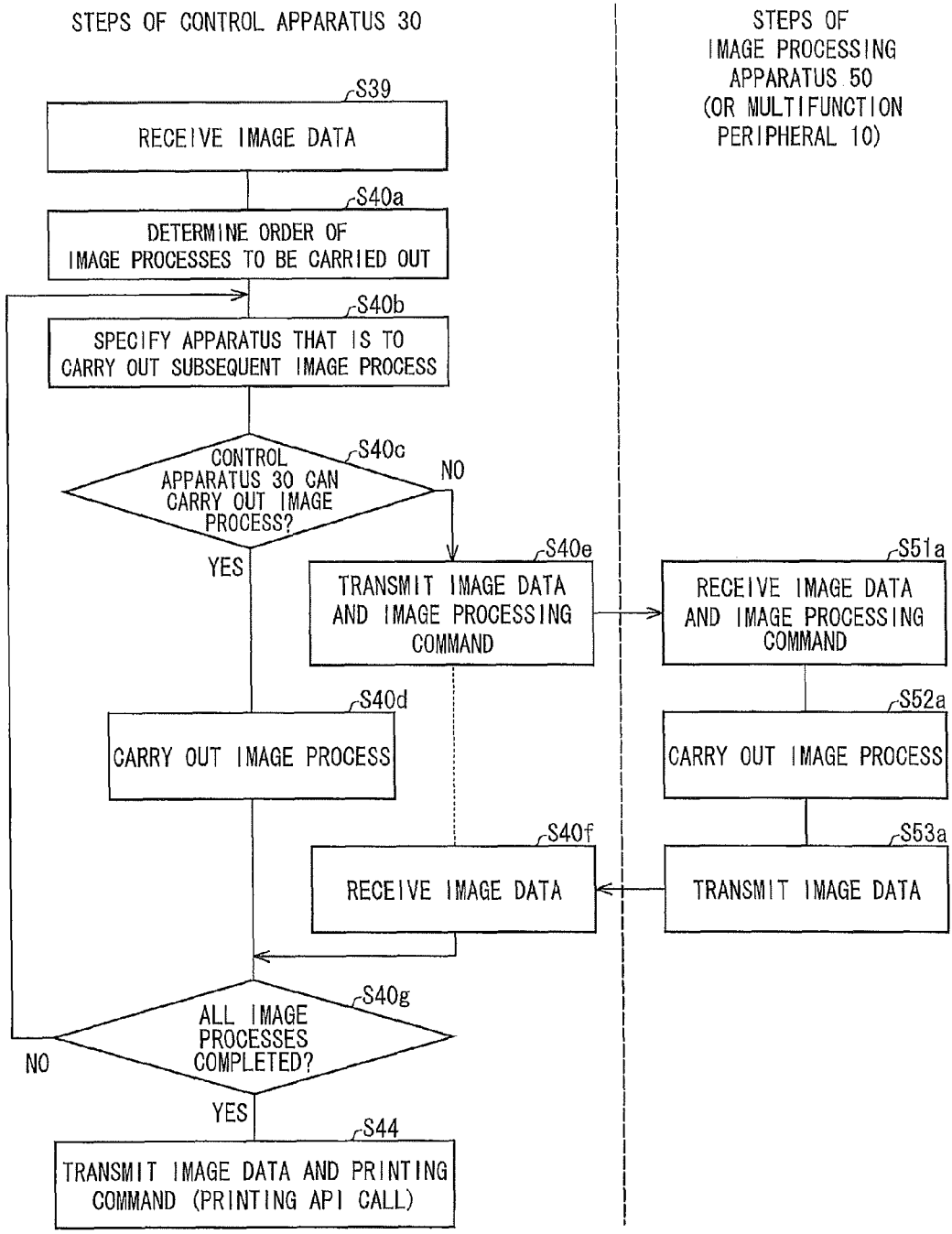
FIG. 6 is a flowchart illustrating a variation of the steps shown in FIG. 3.

The present embodiment may alternatively be arranged to combine (i) an image process to be carried out by the image process section 15 of the multifunction peripheral 10, (ii) an image process to be carried out by the image process section 34 of the control apparatus 30, and (iii) an image process to be carried out by the image process section 54 of the image processing apparatus 50, and thus carry out the combination. This alternative arrangement simply requires the control section 32 (external application section 36) of the control apparatus 30 to carry out the steps S40a to S40g in FIG. 6 instead of the steps S40 to S43 in FIG. 4.

Specifically, when the control apparatus 30 has received image data from the multifunction peripheral 10 in S39, the external application section 36 determines the order of individual image processes to be carried out with respect to the image data (S40a). The external application section 36 then (i) specifies an apparatus (in the present embodiment, the control apparatus 30, the image processing apparatus 50, or the multifunction peripheral 10) that is to carry out an image process to be carried out subsequently (S40b), and (ii) determines whether the specified apparatus is the control apparatus 30 (S40c). In the case where the external application section 36 has determined in S40c that the specified apparatus is the control apparatus 30, the external application section 36 controls the image process section 34 to cause the image process section 34 to carry out the image process (S40d), whereby the flow proceeds to the step S40g.

In the case where the external application section 36 has determined in S40c that the specified apparatus is not the control apparatus 30, the control section 32 (external application section 36) transmits, to the specified apparatus (either the image processing apparatus 50 or the multifunction peripheral 10) that is to carry out the subsequent image process, the image data and an image processing command for causing the specified apparatus to carry out the image process (S40e).

The specified apparatus (either the image processing apparatus 50 or the multifunction peripheral 10) that is to carry out the subsequent image process, upon receipt of the image data and the image processing command from the control apparatus 30 (S51a), (i) causes an image process section of itself (either the image process section 54 or the image process section 15) to carry out the image process responding to the image processing command (S52a), and (ii) transmits, to the control apparatus 30, the image data that has been subjected to the image process (S53a).

The external application section 36, in the case where (i) it has received the image data that has been subjected to the image process (S40f) and in the case where (ii) the image process in S40d has been completed, determines whether all the image processes have been completed (S40g). In the case where the external application section 36 has determined that there remains an uncompleted image process, the flow returns to the step S40b. In the case where the external application section 36 has determined that all the image processes have been completed, the external application section 36 (i) creates a printing command (printing API call) for causing the image forming section 14 to carry out a printing process and (ii) transmits the printing command to the web server section 35. The web server section 35 then transmits, to the multifunction peripheral 10 via the communication section 31, (i) the image data that has been subjected to the image process and (ii) the printing command (S44).

The present embodiment may alternatively be arranged such that (i) when the control apparatus 30 transmits, to the multifunction peripheral 10, image data and a command for printing that image data, the printing command includes user authentication information (for example, user ID) provided by a user who permits the printing process to be carried out, and that (ii) the printing process is carried out after a user authentication process is carried out. In other words, the present embodiment may be arranged to permit a printing process to be carried out only in the case where user authentication information inputted by a user operating the multifunction peripheral 10 matches user authentication information included in a printing command.

For instance, the present embodiment may be arranged such that (i) when a request for transmission of an operation screen is transmitted in S2, copying condition information is transmitted in S7, or scanned image data is transmitted in S14, user authentication information provided by a user operating the multifunction peripheral 10 is transmitted from the multifunction peripheral 10 to the control apparatus 30, and (ii) the user authentication information is included in a printing command that the control apparatus 30 transmits to the multifunction peripheral 10 in S44. The method for obtaining user authentication information provided by a user operating the multifunction peripheral 10 is not particularly limited; for instance, (i) a user may input user authentication information by operating the input section 12a, or (ii) an IC card held by the user may be read for user authentication information with use of a card reader (not shown) included in the multifunction peripheral 10.

In the above alternative arrangement, the control section 11 (web browser section 22) of the multifunction peripheral 10, upon receipt, from the control apparatus 30, of (i) image data and (ii) a printing command including user authentication information, causes a storage section (not shown) of the multifunction peripheral 10 to store the image data and the printing command. When the multifunction peripheral 10 has received an input of user authentication information that matches the user authentication information included in the stored printing command, the printing command is transmitted to the control application section 23 so that a printing process responding to the printing command is carried out.

The present embodiment is arranged such that (i) the image process section 15 of the multifunction peripheral 10 carries out image processes corresponding to the respective setting items of "NUMBER OF COPIES", "SHEET SIZE", "COLOR MODE", "ZOOMING", and "DENSITY", (ii) the image process section 34 of the control apparatus 30 carries out image processes corresponding to the respective setting items of "BLANK SHEET REMOVAL", "SKEW CORRECTION", and "AUTOMATIC ROTATION", and (iii) the image process section 54 of the image processing apparatus 50 carries out image processes corresponding to the respective setting items of "TRANSLATION" and "RED-EYE CORRECTION". What image processes are carried out by the image process section of which apparatus is, however, not limited to the above combinations, and may be changed as appropriate.

The image processes that can be carried out by the image data processing system 1 of the present embodiment are not limited to the image processes shown in FIG. 4. The present embodiment may alternatively be arranged such that at least one of the image process section 15 of the multifunction peripheral 10, the image process section 34 of the control apparatus 30, and the image process section 54 of the image processing apparatus 50 can carry out a different image process that (i) replaces at least one of the image processes shown in FIG. 3 or that (ii) is added to the image processes shown in FIG. 4. Such a different image process is, for example, any of the image processes shown in FIG. 5.

The present embodiment may be arranged such that the image data processing system 1 includes a plurality of apparatuses that can all carry out a common image process. This arrangement may select in advance an apparatus that is to carry out the common image process. The above arrangement may alternatively cause the common image process to be carried out by, among the apparatuses that can carry out the common image process, the apparatus that has the largest throughput. The above arrangement may further alternatively (i) detect the operating state of each apparatus (for example, whether the apparatus is carrying out another process or on standby, or the number of processes to be carried out by the apparatus) that can carry out the common image process, and (ii) on the basis of the result of the detection, cause the common image process to be carried out by the apparatus that can carry out the common image process earliest. The above arrangement may, in the case where the plurality of apparatuses that can carry out a common image process include a multifunction peripheral 10 that is to carry out a process of scanning an image represented by image data that has been subjected to the common image process, cause that multifunction peripheral 10 to carry out the common image process.

The present embodiment is described as being arranged such that the control apparatus (control apparatus) 30 has, in addition to (i) the function of selecting an apparatus that is to carry out an image process and (ii) the function of controlling the device function of the multifunction peripheral 10, (iii) the function (corresponding to the image process section 34) of carrying out an image process. The present embodiment is, however, not limited to such an arrangement; for instance, the control apparatus (control apparatus) 30 may not have the function (corresponding to the image process section 34) of carrying out an image process. In this alternative arrangement, an image process with respect to image data is carried out by either the image process section 15 of the multifunction peripheral 10 or the image process section 54 of the image processing apparatus 50.

Embodiment 2

The description below deals with another embodiment of the present invention. For convenience of explanation, members of the present embodiment that are similar in function to the respective corresponding members of Embodiment 1 are each assigned a reference numeral that is common between Embodiment 1 and the present embodiment, and are not described here.

Embodiment 1 is arranged such that in the step S44 in FIG. 3, when the image process section 34 of the control apparatus 30 or the image process section 54 of the image processing apparatus 50 has completed an image process, the control apparatus 30 transmits, to the multifunction peripheral 10, (i) image data that has been subjected to an image process and (ii) a command for printing that image data. In contrast, the present embodiment is arranged such that an apparatus other than the multifunction peripheral 10 (that is, a print job managing server 70 described below) temporarily stores (i) image data that has been subjected to an image process by the image process section 34 of the control apparatus 30 or by the image process section 54 of the image processing apparatus 50 and (ii) a command for printing that image data, and that the image data and the printing command are transmitted to the multifunction peripheral 10 in response to an instruction from a user so that the multifunction peripheral 10 carries out a printing process.

Figure 7:
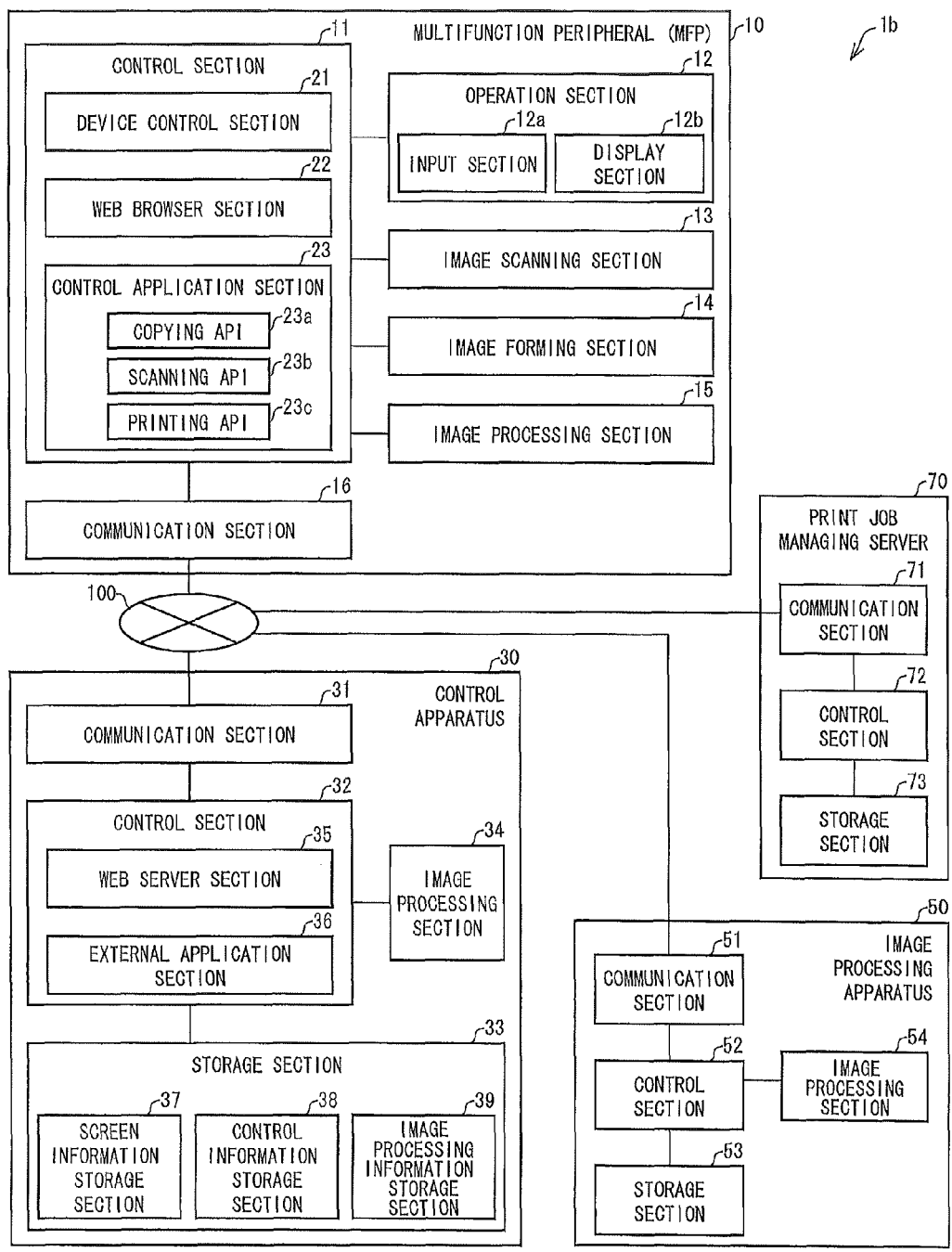
FIG. 7 is an explanatory diagram illustrating a configuration of an image data processing system of another embodiment of the present invention.

FIG. 7 is an explanatory diagram illustrating a configuration of an image data processing system 1b of the present embodiment. As illustrated in FIG. 7, the image data processing system 1b includes, in addition to the members of the image data processing system 1 of Embodiment 1, a print job managing server 70 communicably connected to the other apparatuses over the communications network 100. The print job managing server 70 includes: a communication section 71; a control section 72; and a storage section 73.

The communication section 71 communicates with another apparatus connected to the print job managing server 70 over the communications network 100.

The control section 72 is a computer device including, for example, (i) an arithmetic process section (not shown) such as a CPU and a dedicated processor and (ii) storage means (not shown) such as a RAM, a ROM, and a HDD. The control section 72 (i) reads various information and programs for carrying out various controls, the various information and programs being stored in the storage means, and (ii) executes the programs to control respective operations of the individual sections of the print job managing server 70.

The storage section 73 stores (i) image data received from another apparatus over the communications network 100 and (ii) a printing command for causing the multifunction peripheral 10 to print that image data.

Figure 8:
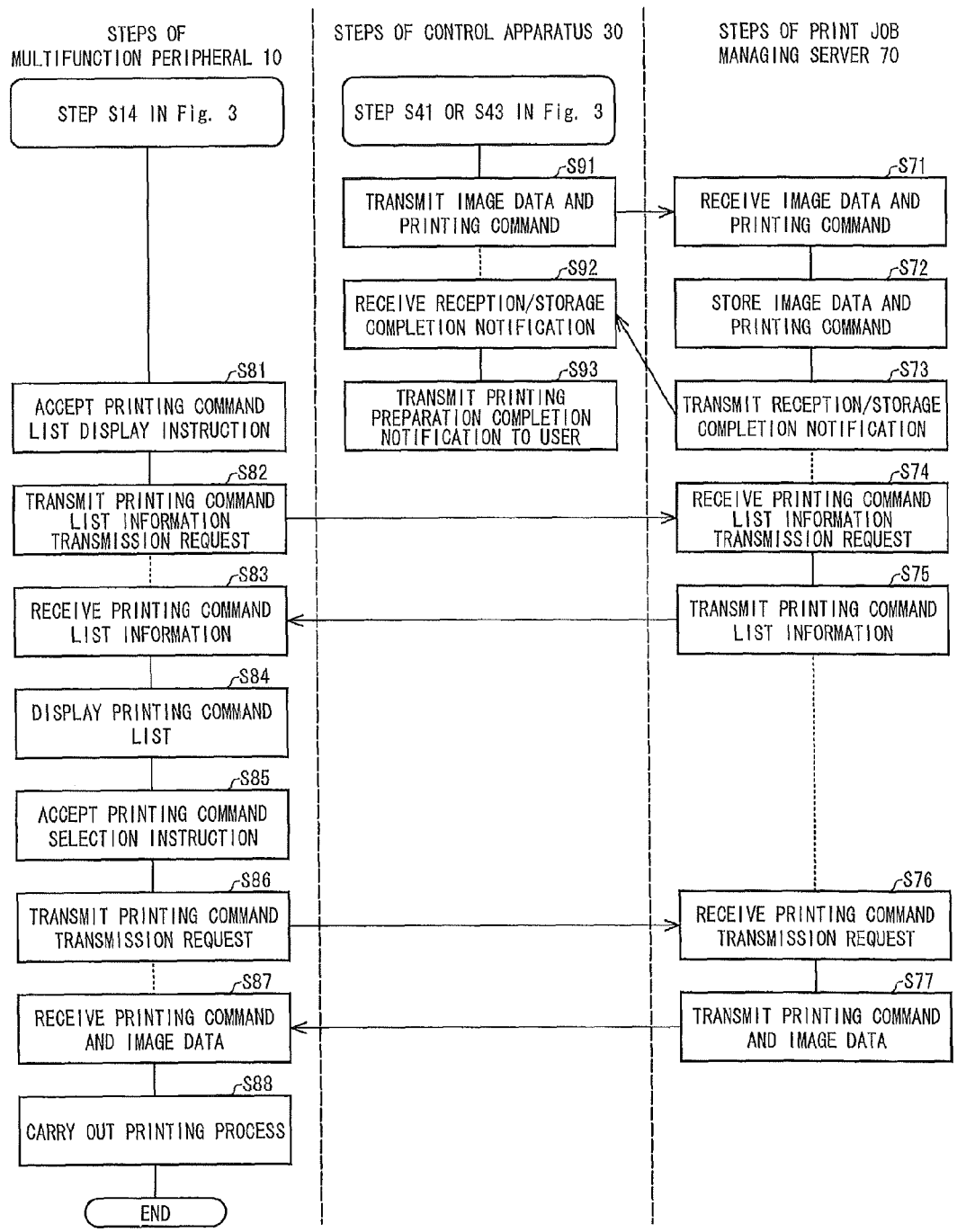
FIG. 8 is a flowchart illustrating a flow of steps carried out by the image data processing system illustrated in FIG. 7.

FIG. 8 is a flowchart illustrating a flow of steps carried out by the image data processing system 1b. For convenience of explanation, FIG. 8 shows only a part of the steps carried out by the image data processing system 1b which part is different from a corresponding part of the steps shown in FIG. 3 for Embodiment 1.

The web server section 35 of the control apparatus 30, after causing the image process section 34 of the control apparatus 30 to carry out an image process in S41 or after receiving image data that has been subjected to an image process from the image processing apparatus 50 in S43, transmits, to the print job managing server 70 via the communication section 31, (i) the image data that has been subjected to an image process and (ii) a printing command for causing a process for printing that image data to be carried out (S91).

The control section 72 of the print job managing server 70, upon receipt of the image data and the printing command via the communication section 71 (S71), (i) causes the storage section 73 to store the received image data and printing command (S72), and transmits, to the control apparatus 30 via the communication section 71, reception/storage completion notification indicative of completion of respective processes of receiving and storing image data and a printing command (S73).

The web server section 35 of the control apparatus 30, upon receipt of the reception/storage completion notification from the print job managing server 70 (S92), transmits, to a destination (for example, an electronic mail address of the user's) specified in advance by the user who has provided a copying start instruction, a printing preparation completion notification (output preparation completion notification) indicative of completion of printing preparation (S93).

The method for setting the above destination is not particularly limited. The present embodiment may be arranged, for instance, such that (i) a user of the multifunction peripheral 10 inputs, through the input section 12a at any timing, destination information indicative of a destination, and that (ii) the web browser section 22 of the multifunction peripheral 10 transmits the destination information to the control apparatus 30. The present embodiment may alternatively be arranged such that (i) user authentication information and destination information indicative of a destination are stored in advance in association with each other in the control apparatus 30, the multifunction peripheral 10, or another apparatus (for example, an authentication server for carrying out a user authentication process) connected to the communications network 100, that (ii) a user authentication process is carried out on the basis of the user authentication information for a user who is to carry out a copying process with use of the multifunction peripheral 10, and that (iii) in the case where the authentication has been successful, the control apparatus 30 obtains the destination information from the apparatus that stores the destination information.

The user who has provided a copying start instruction at the multifunction peripheral 10 (i) receives, at a device such as a mobile terminal device or personal computer of their own, a printing preparation completion notification transmitted from the control apparatus 30 and (ii) reviews the printing preparation completion notification. The user then inputs, at any timing through the input section 12a of the multifunction peripheral 10, an instruction to display a list of printing commands.

The web browser section 22 of the multifunction peripheral 10, upon acceptance of the instruction to display a list of printing commands which instruction has been inputted through the input section 12a (S81), transmits, to the print job managing server 70 via the communication section 16, a request for transmission of printing command list information (S82). Destination information for transmission of the transmission request to the print job managing server 70 may be (i) stored in advance in a storage section (not shown) of the multifunction peripheral 10 or (ii) included in the printing preparation completion notification so that the user inputs the destination information through the input section 12a.

The control section 72 of the print job managing server 70, upon receipt of the request for transmission of printing command list information which request has been transmitted from the multifunction peripheral 10 (S74), transmits, to the multifunction peripheral 10, printing command list information indicative of a list of printing commands stored in the storage section 73 (S75).

The present embodiment may alternatively be arranged as follows: When the multifunction peripheral 10 transmits, to the print job managing server 70, the request for transmission of printing command list information, the multifunction peripheral 10, in addition to the transmission request, transmits, to the print job managing server 70, information for specifying a user who has made that transmission request. The control section 72 of the print job managing server 70 then (i) extracts, from among the printing commands store in the storage section 73, printing commands corresponding to the above user and (ii) transmits, to the multifunction peripheral 10, printing command list information indicative of the extracted printing commands.

The web browser section 22 of the multifunction peripheral 10, upon receipt of the printing command list information transmitted from the print job managing server 70 (S83), causes the display section 12b to display the list of printing commands corresponding to the printing command list information (S84). The web browser section 22, upon acceptance of an instruction to select a printing command which instruction has been inputted through the input section 12a (S85), transmits, to the print job managing server 70, a request for transmission of the selected printing command (S86).

The control section 72 of the print job managing server 70, upon receipt of the printing command transmission request transmitted from the multifunction peripheral 10 (S76), (i) reads, from the storage section 73, the corresponding printing command and image data and (ii) transmits the printing command and the image data to the multifunction peripheral 10 (S77).

The web browser section 22 of the multifunction peripheral 10, upon receipt of the printing command and the image data from the print job managing server 70 (S87), transmits the received printing command and image data to the control application section 23. The control application section 23 then (i) activates the printing API 23c, (ii) creates a control command for causing a printing process responding to the printing command to be carried out, and (iii) transmits the control command to the device control section 21. The device control section 21, in accordance with this control command, controls the image forming section 14 to cause the image forming section 14 to carry out a process of printing an image represented by the image data received in S87 (S88), whereby the flow of the steps ends.

The present embodiment may be arranged such that (i) the above printing command includes user authentication information (for example, a user ID of the user who has provided a copying start instruction in S6) provided by a user who permits a printing process to be carried out, and that the web browser section 22, after it has received the printing command and the image data in S87, carries out a user authentication process before carrying out a printing process. In this case, the printing command and image data both received by the multifunction peripheral 10 in S87 are temporarily stored in a storage section (not shown) of the multifunction peripheral 10, and are, in the case where the user authentication process has been completed successfully, read out from the storage section so that the printing process is carried out.

As described above, the image data processing system 1b of the present embodiment is arranged such that (i) the print job managing server 70 temporarily stores image data that has been subjected to an image process and a printing command for causing that image data to be printed, and that (ii) the control apparatus 30 transmits, to an electronic mail address of the user's, a printing preparation completion notification indicating that the above image data can be printed.

With the above arrangement, the user can cause a printing process to be carried out at any timing after an image process has been completed. Thus, with the above arrangement, the user can, in the case where, for instance, an image process takes a long time, (i) be temporarily away from the multifunction peripheral and then (ii) cause a printing process to be carried out at any timing after the image process has been completed.

The present embodiment is arranged such that an image scanning process and a printing process are both carried out by an identical multifunction peripheral 10. The present embodiment is, however, not limited to such an arrangement. The present embodiment may alternatively be arranged, for instance, such that after the user has received a printing preparation completion notification, the user (i) accesses the print job managing server 70 from any multifunction peripheral or printer (printing apparatus) that can print an image represented by image data, (ii) obtains a printing command and image data, and (iii) causes a printing process to be carried out.

The present embodiment is arranged such that the print job managing server 70 stores image data that has been subjected to an image process and a printing command. The present embodiment is, however, not limited to such an arrangement. The present embodiment may alternatively be arranged, for instance, such that the control apparatus 30 performs functions of the print job managing server 70. In this alternative arrangement, the control apparatus 30 (i) causes the storage section 33 to store image data and a printing command for causing a process of printing that image data to be carried out, the image data and the printing command being both obtained through the step S41 or S43 in FIG. 3, and (ii) transmits a printing preparation completion notification to a destination set by the user in advance. The control apparatus 30 then, (i) upon receipt, from the multifunction peripheral 10, of a request for transmission of printing command list information, transmits printing command list information back to the multifunction peripheral 10, and (ii) upon receipt of a printing command transmission request from the multifunction peripheral 10, transmits a corresponding printing command and image data back to the multifunction peripheral 10.

The present embodiment is arranged such that (i) the print job managing server 70 transmits a printing preparation completion notification to the control apparatus 30 and that (ii) the control apparatus 30 transmits a reception/storage completion notification to a destination specified by the user in advance. The present embodiment is, however, not limited to such an arrangement. The present embodiment may alternatively be arranged, for instance, such that (i) the control apparatus 30, in addition to image data and a printing command, transmits, to the print job managing server 70, destination information indicative of a destination specified by the user in advance and that (ii) the print job managing server 70 transmits a printing preparation completion notification to the above destination.

Embodiment 3

The description below deals with still another embodiment of the present invention. For convenience of explanation, members of the present embodiment that are similar in function to the respective corresponding members of Embodiment 1 are each assigned a reference numeral that is common between Embodiment 1 and the present embodiment, and are not described here.

Embodiments 1 and 2 each deal with a case in which the process of outputting image data during a complex process is a process of printing image data by the image forming section (image data output process section) 14. In contrast, the present embodiment deals with a case in which the process of outputting image data during a complex process is a process of FAX transmission of image data by the communication section (image data output process section) 16.

Figure 9:
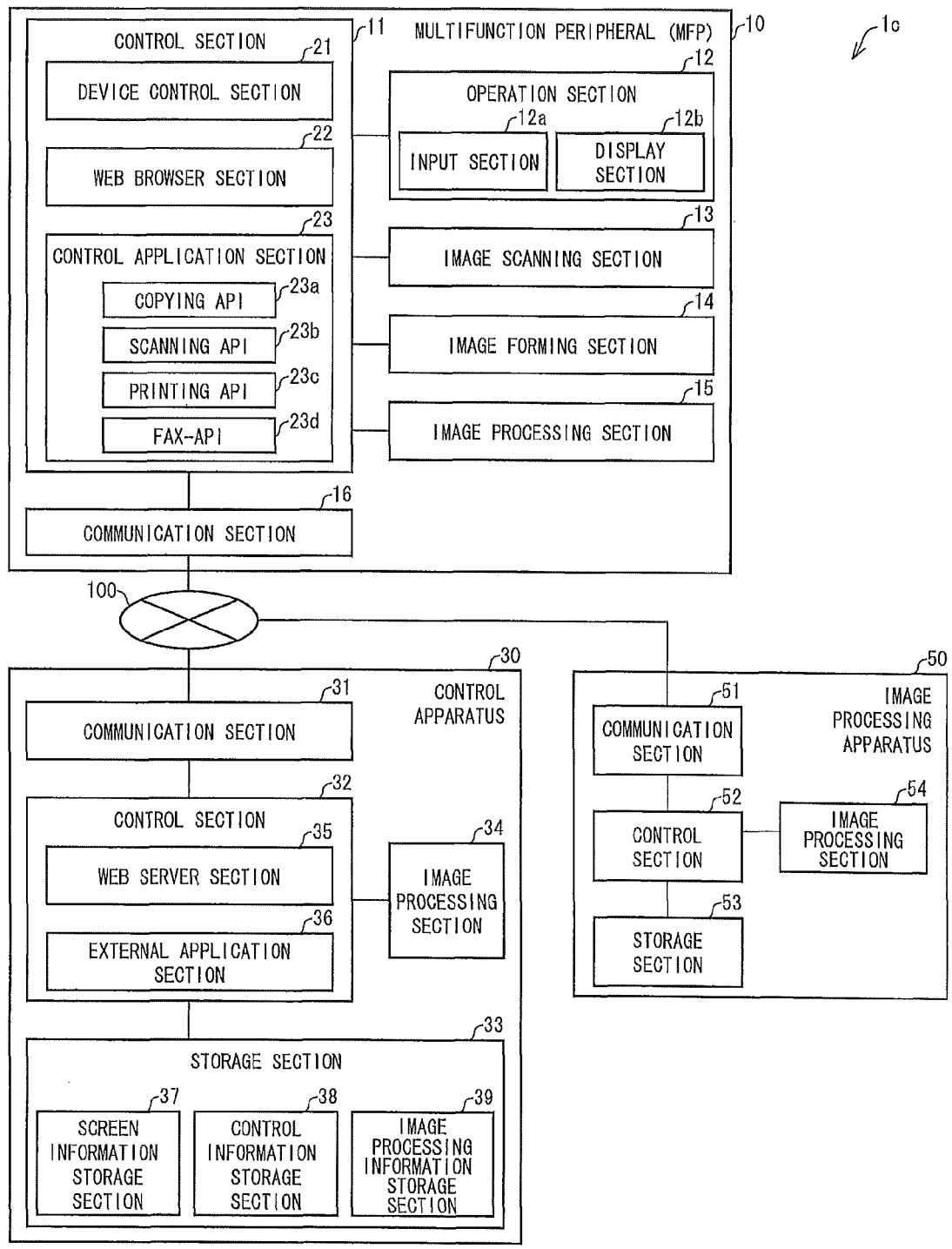
FIG. 9 is an explanatory diagram illustrating a configuration of an image data processing system of still another embodiment of the present invention.

FIG. 9 is an explanatory diagram illustrating a configuration of an image data processing system 1c of the present embodiment. As illustrated in FIG. 9, the image data processing system 1c includes, in addition to the members of the image data processing system 1 of Embodiment 1, a FAX-API 23d in the control application section 23 included in the control section 11 of the multifunction peripheral 10.

The FAX-API 23d, upon receipt of (i) data of a FAX condition setting (for example, a resolution setting, a color/monochrome setting, or a destination setting) and (ii) a start command (complex process command) for a FAX process (complex process) from the control apparatus 30, controls the device control section 21 to cause the device control section 21 to carry out a FAX process (that is, a document reading process and a FAX transmission process) on the basis of the FAX condition setting.

Figure 10:
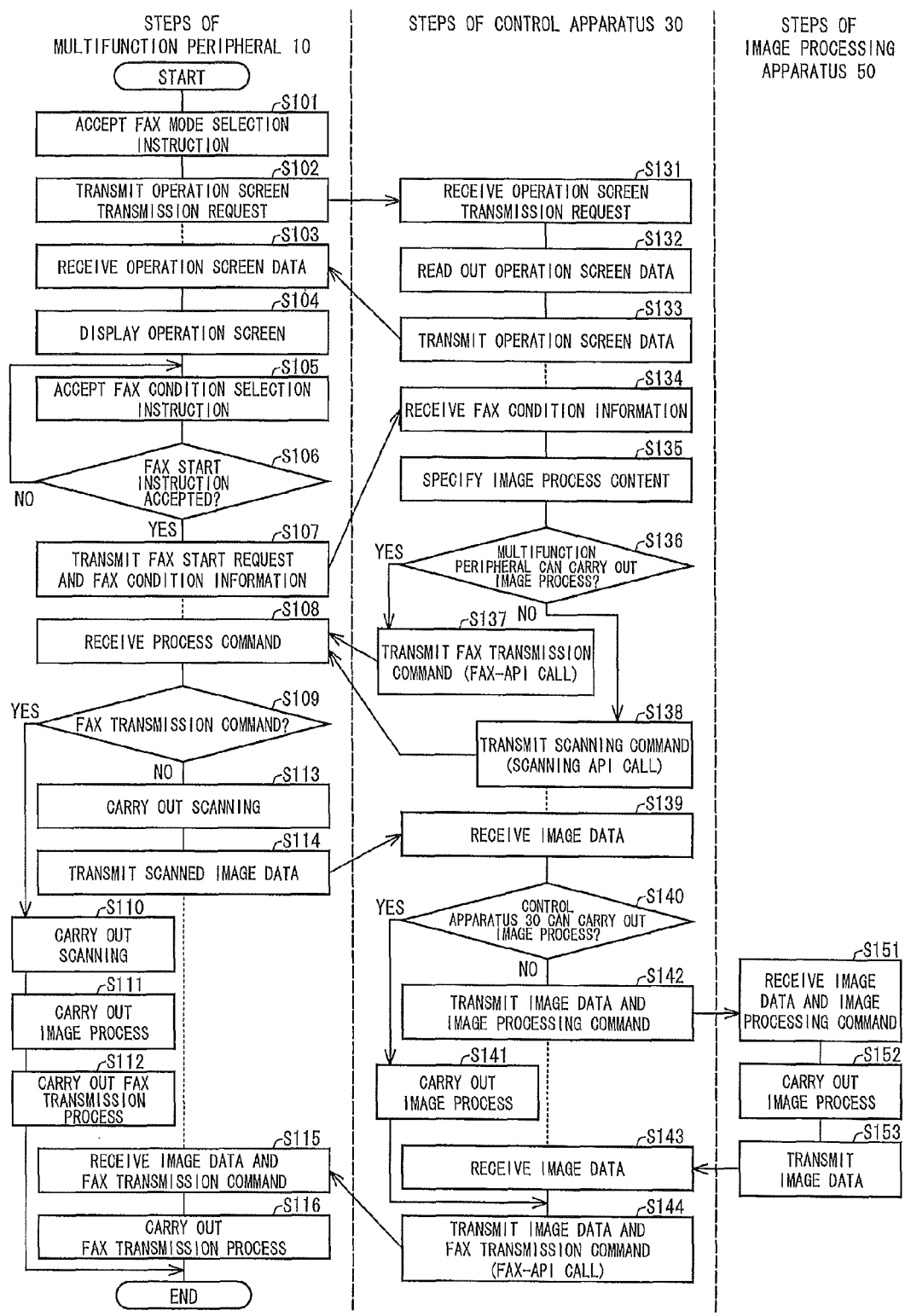
FIG. 10 is a flowchart illustrating a flow of steps carried out by the image data processing system illustrated in FIG. 9.

FIG. 10 is a flowchart illustrating a flow of the FAX process (complex process) carried out by the image data processing system 1c.

The web browser section 22 of the multifunction peripheral 10, upon acceptance of an instruction, from the user via the operation section 12, to select a FAX mode (complex process mode) (S101), transmits, to the control apparatus 30 via the communication section 16, a request for transmission of an operation screen for the FAX mode (S102).

The web server section 35 of the control apparatus 30, upon receipt of the operation screen transmission request from the multifunction peripheral 10 (S131), (i) reads, from the screen information storage section 37, data of the operation screen responding to the transmission request (that is, HTML data of the operation screen) (S132), and (ii) transmits the operation screen data to the multifunction peripheral 10 via the communication section 31 (S133).

The web browser section 22 of the multifunction peripheral 10, upon receipt of the operation screen data from the control apparatus 30 (S103), controls the display section 12b to cause the display section 12b to display the operation screen represented by the operation screen data (S104). This operation screen allows the user to select a FAX condition such as a document size, resolution at which to read a document, content of an image process to be carried out with respect to image data, resolution for image data to be transmitted by FAX, a FAX transmission method, and transmission destination information.

After S104, the web browser section 22 accepts an instruction (that is, an instruction to set individual setting items), from the user through the operation screen displayed in S104, to select a FAX condition (that is, the content of an image process) (S105). The web browser section 22 then determines whether to have accepted a FAX start instruction (operation of a "start FAX" button; an instruction to start a complex process) (S106). In the case where the web browser section 22 has determined that it has not accepted a FAX start instruction, the steps S105 and S106 are repeated.

In the case where the web browser section 22 has determined in S106 that it has accepted a FAX start instruction, the web browser section 22 (i) creates FAX condition information (process content information) indicative of a currently set FAX condition (image process content) and (ii) transmits a FAX start request (that is, a request for start of a complex process) and the FAX condition information to the control apparatus 30 via the communication section 16 (S107).

The web server section 35 of the control apparatus 30, upon receipt of the FAX condition information from the multifunction peripheral 10 (S134), transmits the received FAX condition information to the external application section 36. The external application section 36 specifies, on the basis of the FAX condition information, the content of an image process to be carried out with respect to the image data (S135).

The external application section 36 determines, with reference to an image processing information table stored in the image processing information storage section 39, whether the image process specified in S135 can be carried out by the image process section 15 of the multifunction peripheral 10 (S136).

In the case where the external application section 36 has determined in S136 that the image process can be carried out by the image process section 15 of the multifunction peripheral 10, the external application section 36 creates a FAX transmission command (FAX-API call; process command) and transmits the FAX transmission command to the web server section 35. The web server section 35 then transmits this FAX transmission command to the multifunction peripheral 10 via the communication section 31 (S137). This FAX transmission command includes a control command for causing (i) the image scanning section 13 to carry out a process of reading a document, (ii) the image process section 15 to carry out an image process under a FAX condition set by the user, and (iii) the communication section 16 to carry out a process of FAX transmission of the image data that has been subjected to the image process.

In the case where the external application section 36 has determined in S136 that the image process cannot be carried out by the image process section 15 of the multifunction peripheral 10, the external application section 36 creates a scanning command (scanning API call; process command) and transmits the scanning command to the web server section 35. The web server section 35 then transmits this scanning command to the multifunction peripheral 10 via the communication section 31 (S138). This scanning command includes a control command for causing the image scanning section 13 to (i) carry out a process of reading a document and to (ii) transmit the scanned image data to a predetermined destination (in the present embodiment, the control apparatus 30).

The web browser section 22 of the multifunction peripheral 10, upon receipt of the process command (that is, a FAX transmission command or a scanning command) from the control apparatus 30 (S108), transmits the received process command to the control application section 23. The control application section 23 then determines whether the received process command is a FAX transmission command (S109).

In the case where the control application section 23 has determined in S109 that the process command is a FAX transmission command, the control application section 23 (i) activates the FAX-API 23*d*, (ii) creates a control command for causing a FAX transmission process responding to the FAX transmission command to be carried out, and (iii) transmits the control command to the device control section 21. The device control section 21, in accordance with this control command, controls (i) the image scanning section 13 to cause the image scanning section 13 to carry out a process of reading a document (S110), (ii) the image process section 15 to cause the image process section 15 to carry out, with respect to image data scanned by the image scanning section 13, the image process under the FAX condition set by the user (S111), and (iii) the communication section 16 to cause the communication section 16 to carry out a process of FAX transmission, to a destination under the FAX condition set by the user, of the image data that has been subjected to an image process by the image process section 15 (S112), whereby the flow of the FAX process ends.

In the case where the control application section 23 has determined in S109 that the process command is not a FAX transmission command (that is, the process command is a scanning command), the control application section 23 (i) activates the scanning API 23*b*, (ii) creates a control command for causing a scanning process responding to the scanning command to be carried out, and (iii) transmits the control command to the device control section 21. The device control section 21, in accordance with this control command, controls (i) the image scanning section 13 to cause the image scanning section 13 to carry out a process of reading a document (S113) and (ii) the communication section 16 to cause the communication section 16 to transmit the scanned image data to a destination (in the present embodiment, the control apparatus 30) corresponding to the scanning command (S114).

The external application section 36 of the control apparatus 30, upon receipt of the image data from the multifunction peripheral 10 (S139), determines, with reference to the image processing information table stored in the image processing information storage section 39, whether the image process specified in S135 can be carried out by the image process section 34 of the control apparatus 30 (S140).

In the case where the external application section 36 has determined in S140 that the image process can be carried out by the image process section 34, the external application section 36 causes the image process section 34 to carry out the image process specified in S135 (S141), and then transmits, to the web server section 35, (i) the image data that has been subjected to the image process and (ii) a FAX transmission command (FAX-API call) for causing the communication section 16 to carry out a process of FAX transmission of the image data. The web server section 35 transmits the image data and the FAX transmission command to the multifunction peripheral 10 via the communication section 31 (S144).

In the case where the external application section 36 has determined in S140 that the image process cannot be carried out by the image process section 34, the external application section 36 transmits, to the web server section 35, (i) the image data received in S139 and (ii) an image processing command for causing the image process section 54 of the image processing apparatus 50 to carry out the image process specified in S135. The web server section 35 transmits the image data and the image processing command to the image processing apparatus 50 via the communication section 31 (S142).

The control section 52 of the image processing apparatus 50, upon receipt of the image data and the image processing command from the control apparatus 30 (S151), (i) causes the image process responding to the image processing command to be carried out with respect to the image data (S152) and (ii) transmits, to the control apparatus 30 via the communication section 51, the image data that has been subjected to the image process (S153).

The external application section 36 of the control apparatus 30, upon receipt, from the image processing apparatus 50, of the image data that has been subjected to the image process (S143), (i) creates a FAX transmission command (FAX-API call) for causing the communication section 16 to carry out a process of FAX transmission of the image data and then (ii) transmits the printing command to the web server section 35. The web server section 35 transmits, to the multifunction peripheral 10 via the communication section 31, (i) the image data that has been subjected to the image process and (ii) the FAX transmission command both received from the image processing apparatus 50 (S144).

The web browser section 22 of the multifunction peripheral 10, upon receipt of the image data and the FAX transmission command from the control apparatus 30 (S115), transmits the image data and the FAX transmission command to the control application section 23. The control application section 23 then (i) activates the FAX-API 23*d*, (ii) creates a control command for causing the FAX transmission process responding to the FAX transmission command to be carried out, and (iii) transmits the control command to the device control section 21. The device control section 21, in accordance with this control command, controls the communication section 16 to cause the communication section 16 to carry out the process of FAX transmission of the image data received in S115 (S116), whereby the flow of the FAX process ends.

Embodiment 4

The description below deals with yet another embodiment of the present invention. For convenience of explanation, members of the present embodiment that are similar in function to the respective corresponding members of Embodiment 1 are each assigned a reference numeral that is common between Embodiment 1 and the present embodiment, and are not described here.

Embodiments 1 and 2 each deal with a case in which the process of outputting image data during a complex process is a process of printing image data by the image forming section (image data output process section) 14. Embodiment 3 deals with a case in which the process of outputting image data during a complex process is a process of FAX transmission of image data by the communication section (image data output process section) 16. In contrast, the present embodiment deals with a case in which the process of outputting image data during a complex process is a process of filing image data by a multifunction peripheral.

Figure 11:
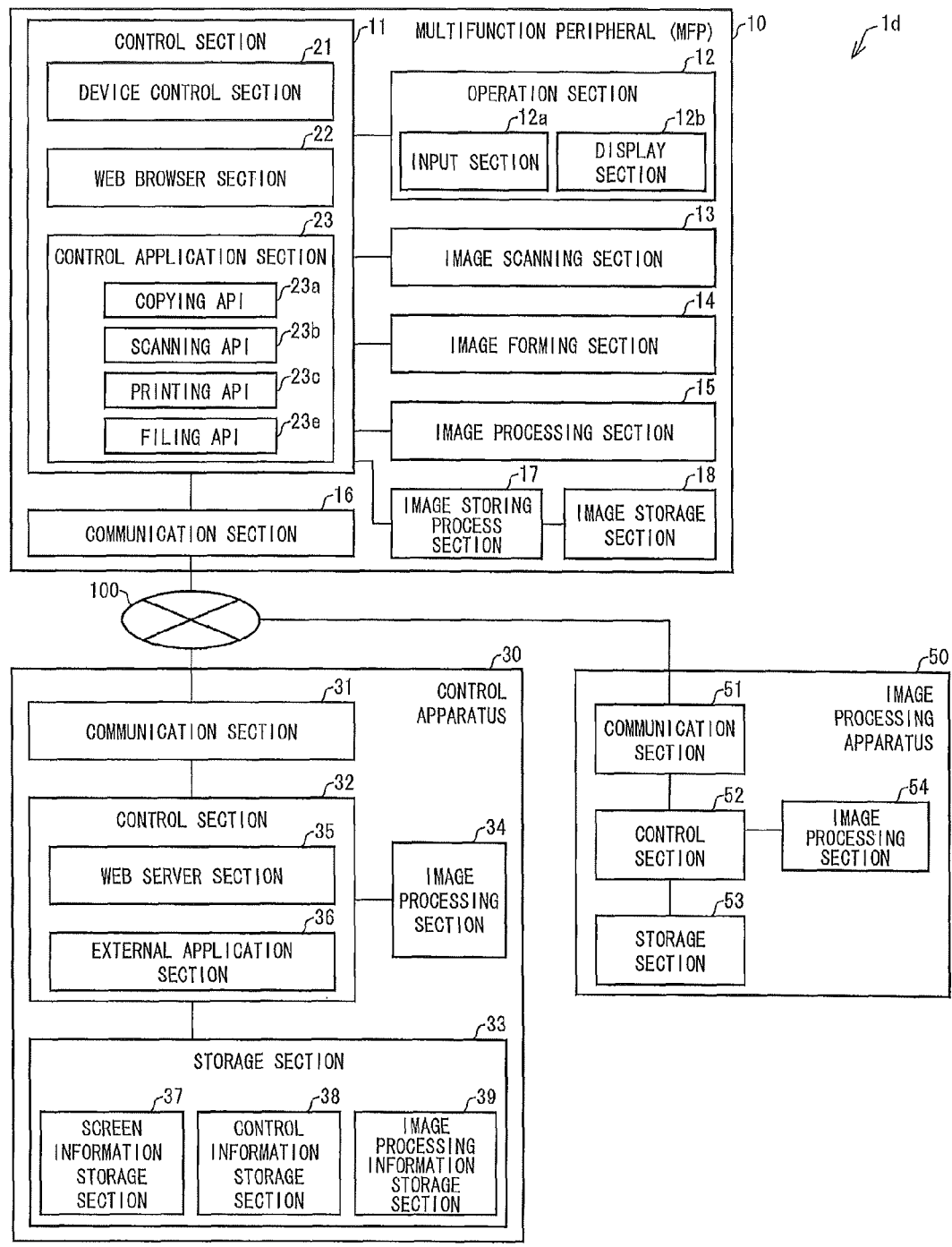
FIG. 11 is an explanatory diagram illustrating a configuration of an image data processing system of yet another embodiment of the present invention.

FIG. 11 is an explanatory diagram illustrating a configuration of an image data processing system 1*d* of the present embodiment. As illustrated in FIG. 11, the image data processing system 1*d* includes, in addition to the members of the image data processing system 1 of Embodiment 1: a filing API 23*e*; an image storing process section 17; and an image storage section 18.

The filing API 23*e* is included in the control application section 23 in the control section 11 of the multifunction peripheral 10. The filing API 23e, upon receipt of (i) data of a filing condition setting (for example, a resolution setting, a color/monochrome setting, or a filing destination setting) and (ii) a start command (complex process command) for a filing process (complex process) from the control apparatus 30, controls the device control section 21 to cause the device control section 21 to carry out a filing process (that is, a document reading process and a filing process) on the basis of the filing condition setting.

The image storing process section 17 carries out (i) a process of writing image data to the image storage section 18 and (ii) a process of reading image data from the image storage section 18.

The image storage section 18 includes a storage medium for storing image data. The storage medium can be, for example: a tape such as a magnetic tape or a cassette tape; a disk including (i) a magnetic disk such as a floppy (registered trademark) disk or a hard disk and (ii) an optical disk such as a CD-ROM, an MO disk, an MD, a DVD, or a CD-R; a card such as an IC card (memory card) or an optical card; or a semiconductor memory such as a mask ROM, an EPROM, an EEPROM, or a flash ROM. The present embodiment is arranged such that the image storage section 18 is included inside the multifunction peripheral 10. The present embodiment is, however, not limited to such an arrangement. For instance, the image storage section 18 may be (i) detachably attached to the multifunction peripheral 10 or (ii) included in a device communicably connected to the multifunction peripheral 10.

Figure 12:
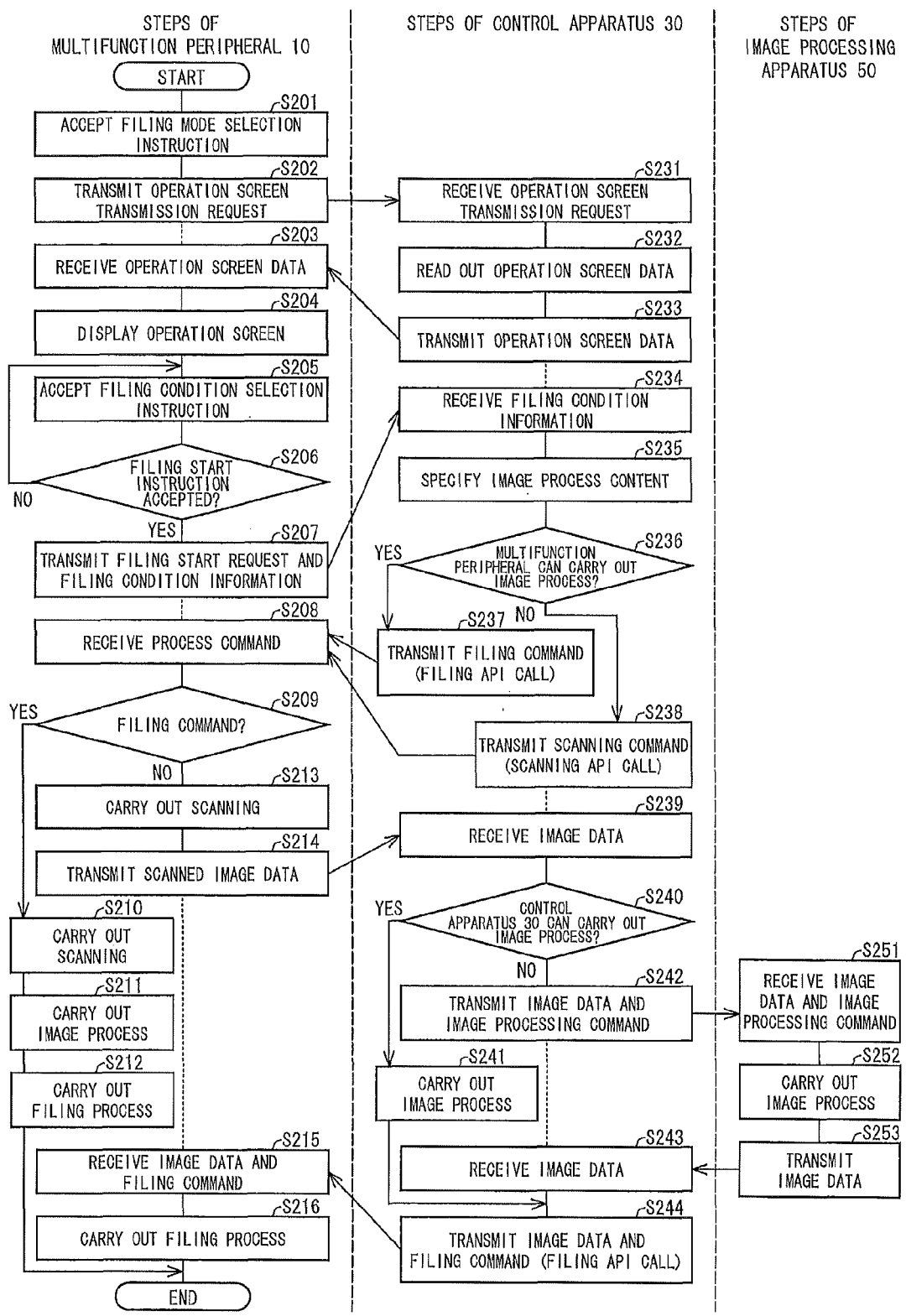
FIG. 12 is a flowchart illustrating a flow of steps carried out by the image data processing system illustrated in FIG. 11.

FIG. 12 is a flowchart illustrating a flow of the filing process (complex process) carried out by the image data processing system 1d.

The web browser section 22 of the multifunction peripheral 10, upon acceptance of an instruction, from the user via the operation section 12, to select a filing mode (complex process mode) (S201), transmits, to the control apparatus 30 via the communication section 16, a request for transmission of an operation screen for the filing mode (S202).

The web server section 35 of the control apparatus 30, upon receipt of the operation screen transmission request from the multifunction peripheral 10 (S231), (i) reads, from the screen information storage section 37, data of the operation screen responding to the transmission request (that is, HTML data of the operation screen) (S232), and (ii) transmits the operation screen data to the multifunction peripheral 10 via the communication section 31 (S233).

The web browser section 22 of the multifunction peripheral 10, upon receipt of the operation screen data from the control apparatus 30 (S203), controls the display section 12b to cause the display section 12b to display the operation screen represented by the operation screen data (S204). This operation screen allows the user to select a filing condition such as a document size, resolution at which to read a document, content of an image process to be carried out with respect to image data, resolution for image data to be filed, a data format for image data to be filed, and filing destination information.

After S204, the web browser section 22 accepts an instruction (that is, an instruction to set individual setting items), from the user through the operation screen displayed in S204, to select a filing condition (that is, the content of an image process) (S205). The web browser section 22 then determines whether to have accepted a filing start instruction (operation of a "start filing" button; an instruction to start a complex process) (S206). In the case where the web browser section 22 has determined that it has not accepted a filing start instruction, the steps S205 and S206 are repeated.

In the case where the web browser section 22 has determined in S206 that it has accepted a filing start instruction, the web browser section 22 (i) creates filing condition information (process content information) indicative of a currently set filing condition (image process content) and (ii) transmits a filing start request (that is, a request for start of a complex process) and the filing condition information to the control apparatus 30 via the communication section 16 (S207).

The web server section 35 of the control apparatus 30, upon receipt of the filing condition information from the multifunction peripheral 10 (S234), transmits the received filing condition information to the external application section 36. The external application section 36 specifies, on the basis of the filing condition information, the content of an image process to be carried out with respect to the image data (S235).

The external application section 36 determines, with reference to an image processing information table stored in the image processing information storage section 39, whether the image process specified in S235 can be carried out by the image process section 15 of the multifunction peripheral 10 (S236).

In the case where the external application section 36 has determined in S236 that the image process can be carried out by the image process section 15 of the multifunction peripheral 10, the external application section 36 creates a filing command (filing-API call; process command) and transmits the filing command to the web server section 35. The web server section 35 then transmits this filing command to the multifunction peripheral 10 via the communication section 31 (S237). This filing command includes a control command for causing (i) the image scanning section 13 to carry out a process of reading a document, (ii) the image process section 15 to carry out an image process under a filing condition set by the user, and (iii) the image storing process section 17 to carry out a process of filing the image data that has been subjected to the image process.

In the case where the external application section 36 has determined in S236 that the image process cannot be carried out by the image process section 15 of the multifunction peripheral 10, the external application section 36 creates a scanning command (scanning API call; process command) and transmits the scanning command to the web server section 35. The web server section 35 then transmits this scanning command to the multifunction peripheral 10 via the communication section 31 (S238). This scanning command includes a control command for causing the image scanning section 13 to (i) carry out a process of reading a document and to (ii) transmit the scanned image data to a predetermined destination (in the present embodiment, the control apparatus 30).

The web browser section 22 of the multifunction peripheral 10, upon receipt of the process command (that is, a filing command or a scanning command) from the control apparatus 30 (S208), transmits the received process command to the control application section 23. The control application section 23 then determines whether the received process command is a filing command (S209).

In the case where the control application section 23 has determined in S209 that the process command is a filing command, the control application section 23 (i) activates the filing-API 23e, (ii) creates a control command for causing a filing process responding to the filing command to be carried out, and (iii) transmits the control command to the device control section 21. The device control section 21, in accordance with this control command, controls (i) the image scanning section 13 to cause the image scanning section 13 to carry out a process of reading a document (S210), (ii) the image process section 15 to cause the image process section 15 to carry out, with respect to image data scanned by the image scanning section 13, the image process under the filing condition set by the user (S211), and (iii) the image storing process section 17 to cause the image storing process section 17 to carry out a process of filing, to a filing destination under the filing condition set by the user, the image data that has been subjected to an image process by the image process section 15 (S212), whereby the flow of the filing process ends.

In the case where the control application section 23 has determined in S209 that the process command is not a filing command (that is, the process command is a scanning command), the control application section 23 (i) activates the scanning API 23b, (ii) creates a control command for causing a scanning process responding to the scanning command to be carried out, and (iii) transmits the control command to the device control section 21. The device control section 21, in accordance with this control command, controls (i) the image scanning section 13 to cause the image scanning section 13 to carry out a process of reading a document (S213) and (ii) the communication section 16 to cause the communication section 16 to transmit the scanned image data to a destination the present embodiment, the control apparatus 30) corresponding to the scanning command (S214).

The external application section 36 of the control apparatus 30, upon receipt of the image data from the multifunction peripheral 10 (S239), determines, with reference to the image processing information table stored in the image processing information storage section 39, whether the image process specified in S235 can be carried out by the image process section 34 of the control apparatus 30 (S240).

In the case where the external application section 36 has determined in S240 that the image process can be carried out by the image process section 34, the external application section 36 causes the image process section 34 to carry out the image process specified in S235 (S241), and then transmits, to the web server section 35, (i) the image data that has been subjected to the image process and (ii) a filing command (filing-API call) for causing the image storing process section 17 to carry out a process of filing the image data. The web server section 35 transmits the image data and the filing command to the multifunction peripheral 10 via the communication section 31 (S244).

In the case where the external application section 36 has determined in S240 that the image process cannot be carried out by the image process section 34, the external application section 36 transmits, to the web server section 35, (i) the image data received in S239 and (ii) an image processing command for causing the image process section 54 of the image processing apparatus 50 to carry out the image process specified in S235. The web server section 35 transmits the image data and the image processing command to the image processing apparatus 50 via the communication section 31 (S242).

The control section 52 of the image processing apparatus 50, upon receipt of the image data and the image processing command from the control apparatus 30 (S251), (i) causes the image process responding to the image processing command to be carried out with respect to the image data (S252) and (ii) transmits, to the control apparatus 30 via the communication section 51, the image data that has been subjected to the image process (S253).

The external application section 36 of the control apparatus 30, upon receipt, from the image processing apparatus 50, of the image data that has been subjected to the image process (S243), (i) creates a filing command (filing-API call) for causing the image storing process section 17 to carry out a process of filing the image data and then (ii) transmits the printing command to the web server section 35. The web server section 35 transmits, to the multifunction peripheral 10 via the communication section 31, (i) the image data that has been subjected to the image process and (ii) the filing command both received from the image processing apparatus 50 (S244).

The web browser section 22 of the multifunction peripheral 10, upon receipt of the image data and the filing command from the control apparatus 30 (S215), transmits the image data and the filing command to the control application section 23. The control application section 23 then (i) activates the filing-API 23e, (ii) creates a control command for causing the filing process responding to the filing command to be carried out, and (iii) transmits the control command to the device control section 21. The device control section 21, in accordance with this control command, controls the image storing process section 17 to cause the image storing process section 17 to carry out the process of filing the image data received in S215 (S216), whereby the flow of the filing process ends.

The above embodiments are each arranged such that the multifunction peripheral 10 transmits an operation screen transmission request to the control apparatus 30 each time a complex process mode is selected. The above embodiments are, however, not limited to such an arrangement. The above embodiments may each be alternatively arranged, for instance, such that (i) the multifunction peripheral 10, when set to each mode for the first time, stores operation screen data received from the control apparatus 30, and that (ii) the multifunction peripheral 10, when set to that mode for the second time and later, displays the corresponding operation screen on the basis of the operation screen data stored in the multifunction peripheral 10.

Figure 13:
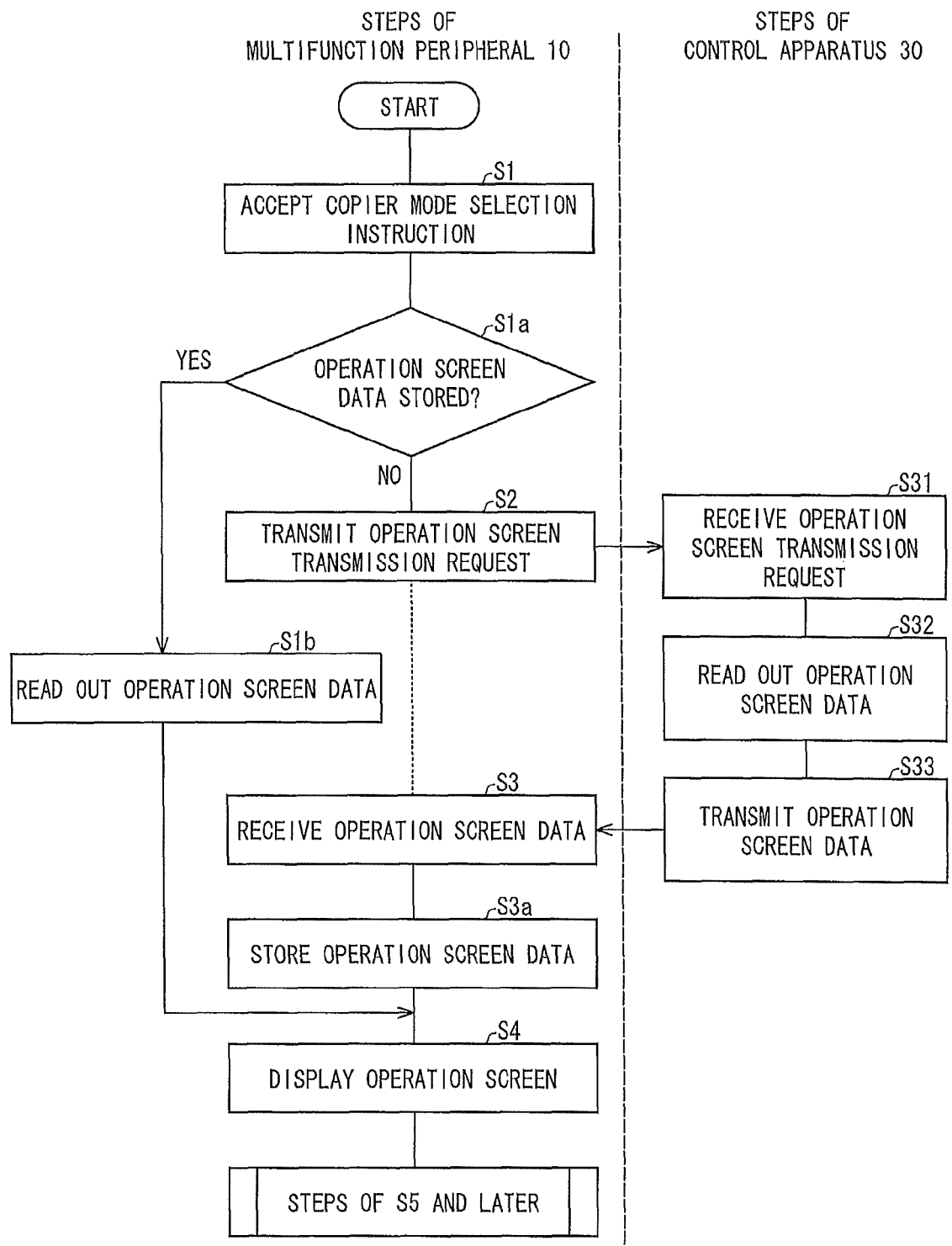
FIG. 13 is a flowchart illustrating a variation of the steps shown in FIG. 3.

FIG. 13 is a flowchart illustrating another flow of the steps for the copier mode described in Embodiment 1 which flow is for the case in which operation screen data is stored in the multifunction peripheral 10. For convenience of explanation, FIG. 13 shows only a part of the flow of the steps which part is different from a corresponding part of the steps in FIG. 3 for Embodiment 1.

The web browser section 22 of the multifunction peripheral 10, upon acceptance of an instruction, from the user via the operation section 12, to select a copier mode (complex process mode) (S1), determines whether operation screen data for the copier mode is stored in a storage section (not shown) of the multifunction peripheral 10 (S1a). In the case where the web browser section 22 has determined that operation screen data for the copier mode is stored in the storage section, the web browser section 22 reads out the operation screen data (S1a), and controls the display section 12b to cause the display section 12b to display an operation screen represented by the operation screen data (S4), after which the steps of S5 and later are carried out. The steps of S5 and later are similar to those of Embodiment 1.

In the case where the web browser section 22 has determined in S1a that operation screen data for the copier mode is not stored in the storage section, the web browser section 22 transmits, to the control apparatus 30 via the communication section 16, a request for transmission of an operation screen for the copier mode (S2).

The web server section 35 of the control apparatus 30, upon receipt of the operation screen transmission request from the multifunction peripheral 10 (S31), (i) reads, from the screen information storage section 37, data of the operation screen responding to the transmission request (that is, HTML data of the operation screen) (S32), and (ii) transmits the operation screen data to the multifunction peripheral 10 via the communication section 31 (S33).

The web browser section 22 of the multifunction peripheral 10, upon receipt of the operation screen data from the control apparatus 30 (S3), (i) causes the storage section (not shown) of the multifunction peripheral 10 to store the received operation screen data (S3a), (ii) controls the display section 12b to cause the display section 12b to display the operation screen represented by the operation screen data (S4), after which the steps of S5 and later are carried out. The steps of S5 and later are similar to those of Embodiment 1.

The above embodiments may each be alternatively arranged such that operation screen data stored in the image storage section 18 of the multifunction peripheral 10 is erased at each predetermined timing (for example, (i) when the multifunction peripheral 10 is turned off, (ii) when the cooperative operation mode is unselected, (iii) when a predetermined period has elapsed after the operation screen data is stored, or (iv) when the multifunction peripheral 10 has received, from the control apparatus 30, a notification that there has been an update to content of the image processes that can be carried out by the image processing apparatus 50). This arrangement allows an update to operation screen data at an appropriate frequency.

The above embodiments may each be alternatively arranged such that (i) when the multifunction peripheral 10 transmits an operation screen transmission request to the control apparatus 30, the multifunction peripheral 10 transmits, to the control apparatus 30, not only an operation screen transmission request but also the user's identification information, and that (ii) the control apparatus 30 transmits, to the multifunction peripheral 10, an operation screen corresponding to that user. For instance, the web server section 35 of the control apparatus 30 transmits, to the multifunction peripheral 10, an operation screen that corresponds to (i) the mode selected by the user and (ii) content of an image process which the user is authorized to use.

Figure 14:
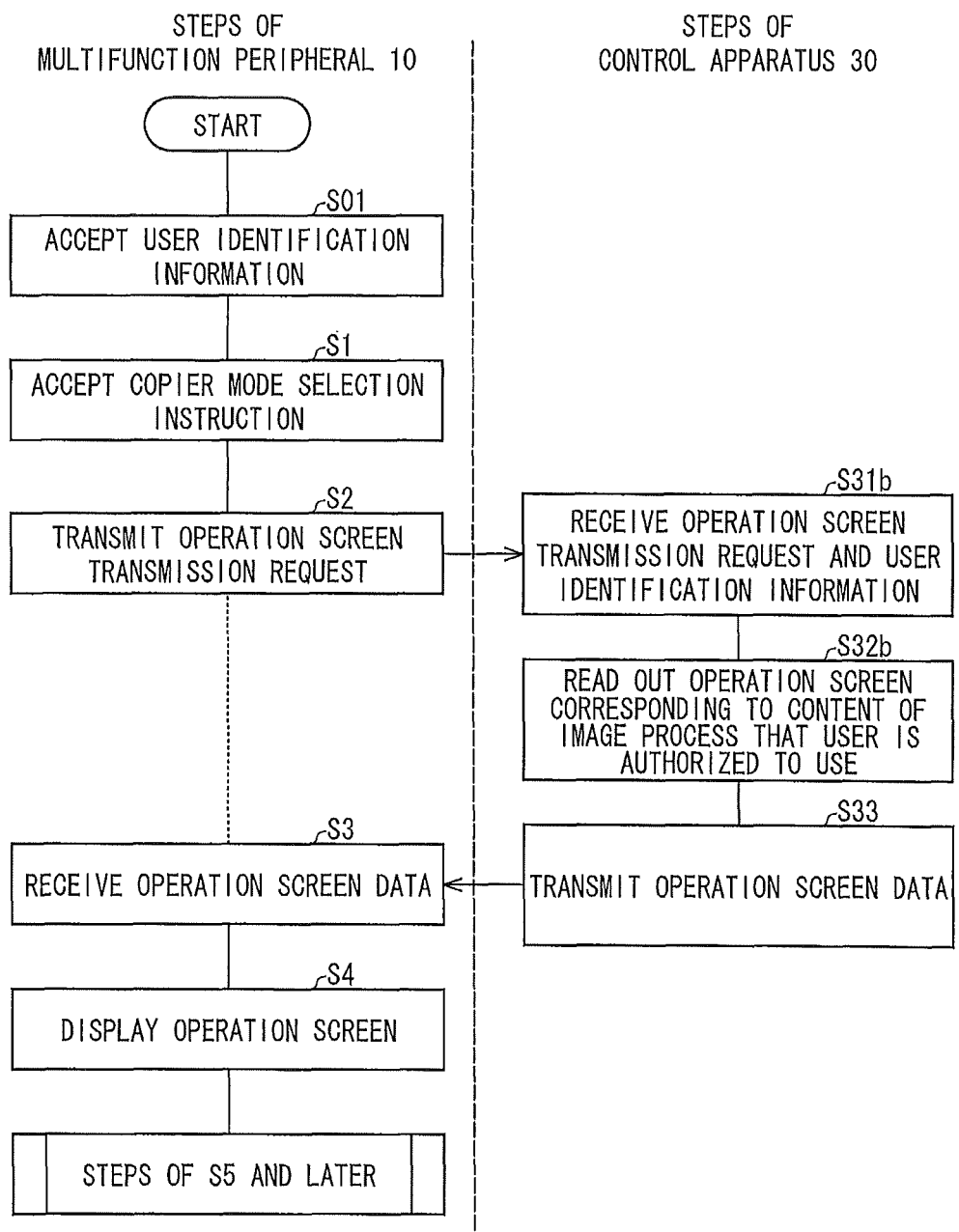
FIG. 14 is a flowchart illustrating a variation of the steps shown in FIG. 3.

FIG. 14 is a flowchart illustrating a flow of the steps for the copier mode described in Embodiment 1 which flow is for the case in which (i) when the multifunction peripheral 10 transmits an operation screen transmission request to the control apparatus 30, the multifunction peripheral 10 transmits, to the control apparatus 30, not only an operation screen transmission request but also the user's identification information, and (ii) the control apparatus 30 transmits, to the multifunction peripheral 10, an operation screen corresponding to that user. For convenience of explanation, FIG. 14 shows only a part of the flow of the steps which part is different from a corresponding part of the steps in FIG. 3 for Embodiment 1.

The web browser section 22 of the multifunction peripheral 10 first accepts a user's identification information (user ID) (S01). For instance, (i) a user may use the operation section 12 to input user identification information, or (ii) user identification information stored in, for example, a memory card held by a user may be read.

The web browser section 22 of the multifunction peripheral 10 then accepts an instruction, from the user via the operation section 12, to select a copier mode (complex process mode) (S1). The steps S01 and S1 may be carried out (i) in the reverse order or (ii) simultaneously.

The web browser section 22 of the multifunction peripheral 10 next transmits, to the control apparatus 30 via the communication section 16, (i) a request for transmission of an operation screen for the copier mode and (ii) the user identification information (S2).

The web server section 35 of the control apparatus 30, upon receipt of the operation screen transmission request and the user identification information from the multifunction peripheral 10 (S31b), (i) reads, from the screen information storage section 37, operation screen data, among operation screen data (HTML data of operation screens) responding to the transmission request, that corresponds to the content of an image process which the user corresponding to the user identification information is authorized to use (S32b), and transmits the above-read operation screen data to the multifunction peripheral 10 via the communication section 31 (S33). Specifically, the screen information storage section 37 stores in advance (i) each of the image processes that can be carried out by the image data processing system 1 (that is, each image process that can be carried out by the image process section 15 of the multifunction peripheral 10, the image process section 34 of the control apparatus 30, or the image process section 54 of the image processing apparatus 50) in association with (ii) user identification information for a user who is to permit that image process to be carried out. The web server section 35 reads, from the screen information storage section 37, operation screen data, among operation screen data corresponding to the mode (complex process mode) selected by the user, that corresponds to the content of an image process which the user corresponding to the user identification information is authorized to use. The web server section 35 may alternatively edit operation screen data, read from the screen information storage section 37, in correspondence with the content of an image process that the user corresponding to the user identification information is authorized to use.

The web browser section 22 of the multifunction peripheral 10, upon receipt of the operation screen data from the control apparatus 30 (S3), controls the display section 12b to cause the display section 12b to display an operation screen represented by the operation screen data (S4), after which the steps of S5 and later are carried out. The steps of S5 and later are similar to those of Embodiment 1.

The above embodiments may each be arranged to, in the case where an image process is carried out by the image process section 54 of an image processing apparatus 50, check, before the image process is carried out, whether the user is authorized to use that image process (or that image processing apparatus 50).

Figure 15:
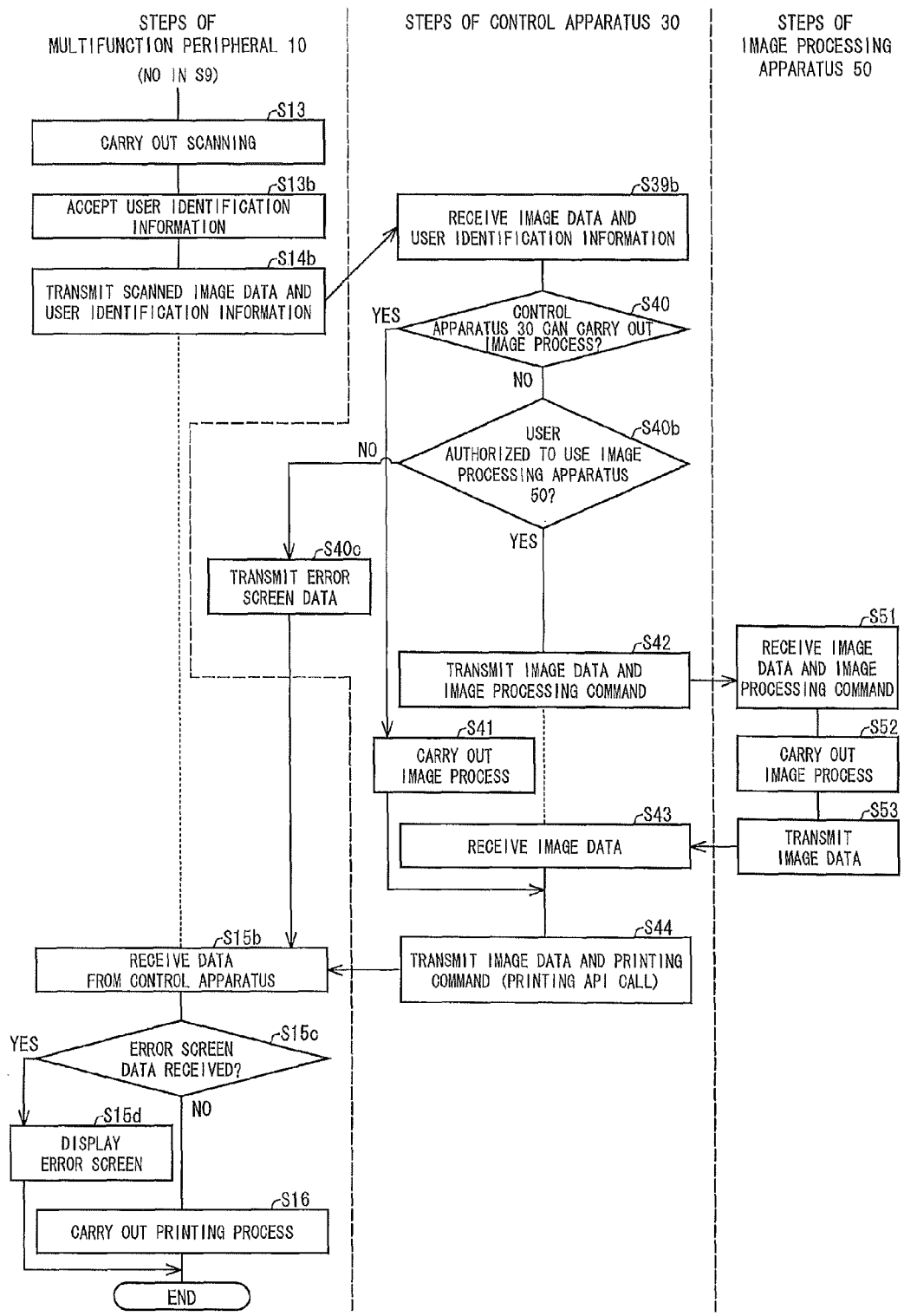
FIG. 15 is a flowchart illustrating a variation of the steps shown in FIG. 3.

FIG. 15 is a flowchart illustrating a flow of the steps for the copier mode described in Embodiment 1 which flow is for the following case: In the case where an image process is carried out by the image process section 54 of an image processing apparatus 50, whether the user is authorized to use that image process is checked before the image process is carried out. For convenience of explanation, FIG. 15 shows only a part of the flow of the steps which part is different from a corresponding part of the steps in FIG. 3 for Embodiment 1.

In the case where the control application section 23 has determined in the step S9 in FIG. 3 that the process command is not a copying command (that is, the process command is a scanning command), the control application section 23 (i) activates the scanning API 23b, (ii) creates a control command for causing (a) a scanning process responding to the scanning command, (b) a process of obtaining user identification information, and (c) a process of transmitting image data and the user identification information to be carried out, and (iii) transmits the control command to the device control section 21. The device control section 21, in accordance with this control command, controls (i) the image scanning section 13 to cause the image scanning section 13 to carry out a process of reading a document (S13), the operation section 12 to cause the operation section 12 to obtain the user's identification information (user ID) (S13b), and the communication section 16 to cause the communication section 16 to transmit, to a destination (in the present embodiment, the control apparatus 30) corresponding to the scanning command, the image data scanned in S13 and the user identification information obtained in S13b (S14b).

The method for obtaining user identification information is not particularly limited. For instance, (i) a user may use the operation section 12 to input user identification information, or (ii) user identification information stored in, for example, a memory card held by a user may be read. Further, the timing at which to obtain user identification information is also not limited to the above timing. The timing may be varied such that (i) the process of obtaining user identification information is carried out before the step S13 so that user identification information is stored in a storage section (not shown) of the multifunction peripheral 10, and that (ii) the user identification information is read out in S13b.

The external application section 36 of the control apparatus 30, upon receipt of the image data and the user identification information from the multifunction peripheral 10 (S39b), determines, with reference to the image processing information table stored in the image processing information storage section 39, whether the image process specified in S35 can be carried out by the image process section 34 of the control apparatus 30 (S40).

In the case where the external application section 36 has determined in S40 that the image process can be carried out by the image process section 34, the external application section 36 causes the image process section 34 to carry out the image process specified in S35 (S41), and then transmits, to the web server section 35, (i) the image data that has been subjected to the image process and (ii) a printing command (printing API call) for causing the image forming section 14 to carry out a process of printing the image data. The web server section 35 transmits the image data and the printing command to the multifunction peripheral 10 via the communication section 31 (S44).

In the case where the external application section 36 has determined in S40 that the image process cannot be carried out by the image process section 34, the external application section 36, by comparing (i) the user identification information received in S39b with (ii) the user identification information stored in advance for the user who is authorized to use an image processing function of the image processing apparatus 50, determines whether the user of the multifunction peripheral 10 is authorized to use an image processing function of the image processing apparatus 50 (S40b). This arrangement may be implemented, for instance, such that (i) the image processing information storage section 39 stores in advance, for each image processing apparatus 50, user identification information for each user who is authorized to use that image processing apparatus 50, and that (ii) the external application section 36 determines, on the basis of the user identification information received from the multifunction peripheral 10, whether there is any image processing apparatus 50 that the user is authorized to use. The above arrangement may alternatively be implemented such that (i) the image processing information storage section 39 stores in advance, for each image processing apparatus 50, each group to which the user who is authorized to use that image processing apparatus 50 belongs (for example, a group of "licensed users", who are users each having a use agreement, or a group of "trial users", who are users each using an image processing apparatus 50 on trial), and that (ii) the external application section 36 determines, on the basis of the user identification information received from the multifunction peripheral 10, whether there is any image processing apparatus 50 that the user is authorized to use.

In the case where the external application section 36 has determined in S40b that the user of the multifunction peripheral 10 is authorized to use an image processing function of the image processing apparatus 50, the external application section 36 transmits, to the web server section 35, (i) the image data received in S39b and (ii) an image processing command for causing the image process section 54 of the image processing apparatus 50 to carry out the image process specified in S35. The web server section 35 transmits the image data and the image processing command to the image processing apparatus 50 via the communication section 31 (S42).

The control section 52 of the image processing apparatus 50, upon receipt of the image data and the image processing command from the control apparatus 30 (S51), (i) causes the image process responding to the image processing command to be carried out with respect to the image data (S52) and (ii) transmits, to the control apparatus 30 via the communication section 51, the image data that has been subjected to the image process (S53).

The external application section 36 of the control apparatus 30, upon receipt, from the image processing apparatus 50, of the image data that has been subjected to the image process (S43), (i) creates a printing command (printing API call) for causing the image forming section 14 to carry out a process of printing the image data and then (ii) transmits the printing command to the web server section 35. The web server section 35 transmits, to the multifunction peripheral 10 via the communication section 31, (i) the image data that has been subjected to the image process and (ii) the printing command both received from the image processing apparatus 50 (S44).

In the case where the external application section 36 has determined in S40b that the user of the multifunction peripheral 10 is not authorized to use an image processing function of the image processing apparatus 50, the external application section 36 creates an error display screen and transmits the error display screen to the multifunction peripheral 10 via the communication section 31 (S40c). This error display screen includes, for example, (i) a display indicating that there has occurred an error and (ii) a display indicating that the copying process has been stopped. This arrangement may be varied such that (i) the screen information storage section 37 stores, in advance, screen data of an error display screen corresponding to the content of possible errors, and that (ii) the external application section 36 reads out the screen data.

The web browser section 22 of the multifunction peripheral 10, upon receipt of data from the control apparatus 30 (S15b), determines whether the received data is error screen data (S15c).

In the case where the web browser section 22 has determined that the received data is error screen data, the web browser section 22 causes the display section 12b to display an error screen (S15d), whereby the flow of the steps ends.

In the case where the web browser section 22 has determined that the received data is not error screen data (that is, the web browser section 22 has received image data and a printing command), the web browser section 22 transmits the received image data and printing command to the control application section 23. The control application section 23 then (i) activates the printing API 23c, (ii) creates a control command for causing the printing process responding to the printing command to be carried out, and (iii) transmits the control command to the device control section 21. The device control section 21, in accordance with this control command, controls the image forming section 14 to cause the image forming section 14 to carry out the process of printing an image represented by the image data received in S15 (S16), whereby the flow of the steps ends.

The above embodiments may each be arranged to, in the case where an image process corresponding to the content of an image process selected by the user can be carried out by any of a plurality of image processing apparatuses 50, select, in correspondence with the user, an image processing apparatus 50 that is to carry out the image process.

Figure 16:
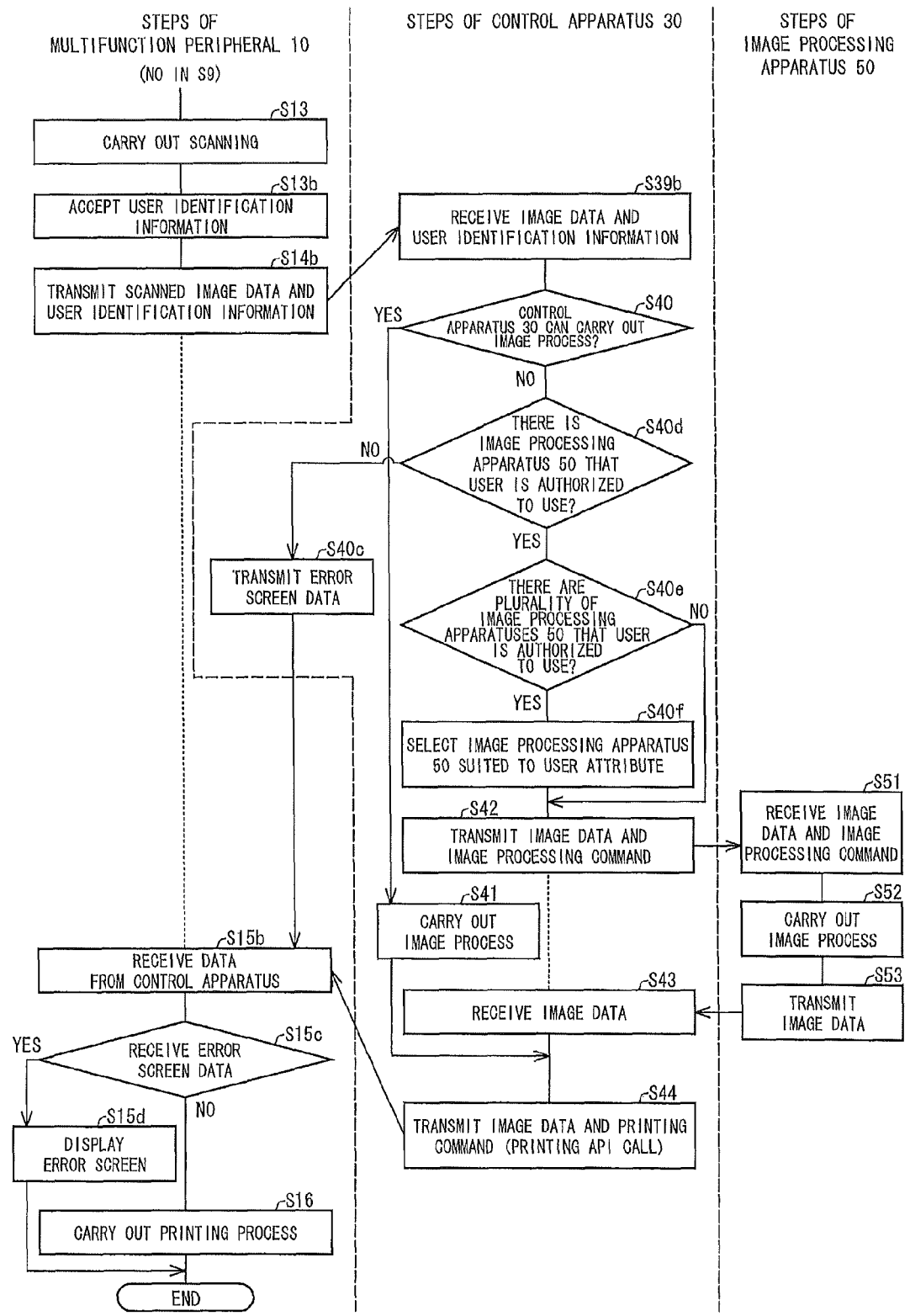
FIG. 16 is a flowchart illustrating a variation of the steps shown in FIG. 15.

FIG. 16 is a flowchart illustrating a flow of the steps for the copier mode shown in FIG. 15 which flow is for the following case: In the case where an image process corresponding to the content of an image process selected by the user can be carried out by any of a plurality of image processing apparatuses 50, an image processing apparatus 50 that is to carry out the image process is selected in correspondence with the user. For convenience of explanation, the description below deals with a part of the steps which part is different from a corresponding part of the steps in FIG. 15.

In the case where the external application section 36 has determined in S40 that the image process specified in S35 cannot be carried out by the image process section 34 of the control apparatus 30, the external application section 36, by comparing the user identification information received in S39b with the user identification information that is stored in advance, with respect to each image processing apparatus 50 connected to the control apparatus 30 over the communications network 100, for the user who is authorized to use an image processing function of the image processing apparatus 50, determines whether there is any image processing apparatus 50 that can carry out the image process specified in S35 and that the user is authorized to use (S40d). This arrangement may be implemented, for instance, such that (i) the image processing information storage section 39 stores in advance, for each image processing apparatus 50, user identification information for each user who is authorized to use that image processing apparatus 50, and that (ii) the external application section 36 determines, on the basis of the user identification information received from the multifunction peripheral 10, whether there is any image processing apparatus 50 that the user is authorized to use. The above arrangement may alternatively be implemented such that (i) the image processing information storage section 39 stores in advance, for each image processing apparatus 50, each group to which users who are authorized to use that image processing apparatus 50 belong (for example, a group of "licensed users", who are users each having a use agreement, or a group of "trial users", who are users each using an image processing apparatus 50 on trial), and that (ii) the external application section 36 determines, on the basis of the user identification information received from the multifunction peripheral 10, whether there is any image processing apparatus 50 that the user is authorized to use.

In the case where the external application section 36 has determined in S40d that there is no image processing apparatus 50 that can carry out the image process specified in S35 and that the user is authorized to use, the external application section 36 creates an error display screen and transmits the error display screen to the multifunction peripheral 10 via the communication section 31 (S40c). This error display screen includes, for example, (i) a display indicating that there has occurred an error and (ii) a display indicating that the copying process has been stopped. This arrangement may be varied such that (i) the screen information storage section 37 stores, in advance, screen data of an error display screen corresponding to the content of possible errors, and that (ii) the external application section 36 reads out the screen data.

In the case where the external application section 36 has determined in S40d that there is an image processing apparatus 50 that can carry out the image process specified in S35 and that the user is authorized to use, the external application section 36 determines whether there are a plurality of such an image processing apparatus 50 that can carry out the image process specified in S35 and that the user is authorized to use (S40e).

The external application section 36 may make the above determination by, for example, (i) first detecting image processing apparatuses 50 that the user is authorized to use and then detecting, from among the thus detected image processing apparatuses 50, image processing apparatuses 50 that can carry out the image process specified in S35, or (ii) first detecting image processing apparatuses 50 that can carry out the image process specified in S35 and then detecting, from among the thus detected image processing apparatuses 50, image processing apparatuses 50 that the user is authorized to use.

In the case where the external application section 36 has determined in S40e that there is only one image processing apparatus 50 that can carry out the image process specified in S35 and that the user is authorized to use, the external application section 36 transmits, to the web server section 35, (i) the image data received in S39b and (ii) an image processing command for causing the image process section 54 of the image processing apparatus 50 to carry out the image process specified in S35. The web server section 35 transmits the image data and the image processing command to the image processing apparatus 50 via the communication section 31 (S42).

In the case where the external application section 36 has determined in S40e that there are a plurality of image processing apparatuses 50 that can carry out the image process specified in S35 and that the user is authorized to use, the external application section 36 selects, from among such a plurality of image processing apparatuses 50, an image processing apparatus 50 suited to a user attribute (S40f).

In the case where, for instance, a plurality of image processing apparatuses 50 can carry out an identical kind of image process, such a plurality of image processing apparatuses 50 are prioritized in advance. The external application section 36 selects, from among image processing apparatuses 50 that can carry out the image process specified in S35 and that the user is authorized to use, the image processing apparatus 50 that has the highest priority. The method for the above prioritization is not particularly limited; a plurality of image processing apparatuses 50 may be prioritized (i) in correspondence with, for example, the image process capacity or payment for use, or (ii) in an order selected by the user in advance.

The external application section 36 may make the above determination by, for example, first (i) detecting image processing apparatuses 50 that can carry out the image process specified in S35, then (ii) determining, in descending order of priority for the thus detected image processing apparatuses 50, whether each image processing apparatus 50 is an image processing apparatus 50 that the user of the multifunction peripheral 10 is authorized to use, and finally (iii) selecting the image processing apparatus 50 determined first as an image processing apparatus 50 that the user of the multifunction peripheral 10 is authorized to use. The external application section 36 may alternatively make the above determination by first (i) detecting image processing apparatuses 50 that can carry out the image process specified in S35, then (ii) extracting, from among the thus detected image processing apparatuses 50, image processing apparatuses 50 that the user is authorized to use, and finally (iii) selecting, from among the thus extracted image processing apparatuses 50, the image processing apparatus 50 that has the highest priority.

The external application section 36 transmits, to the web server section 35, (i) information for specifying the image processing apparatus 50 selected in S40f, (ii) the image data received in S39b, and (iii) an image processing command for causing the image process section 54 of the image processing apparatus 50 to carry out the image process specified in S35. The web server section 35 transmits the image data and the image processing command to the image processing apparatus 50 selected in S40f via the communication section 31 (S42).

The control section 52 of the image processing apparatus 50, upon receipt of the image data and the image processing command from the control apparatus 30 (S51), (i) causes the image process responding to the image processing command to be carried out with respect to the image data (S52) and (ii) transmits, to the control apparatus 30 via the communication section 51, the image data that has been subjected to the image process (S53).

The external application section 36 of the control apparatus 30, upon receipt, from the image processing apparatus 50, of the image data that has been subjected to the image process (S43), (i) creates a printing command (printing API call) for causing the image forming section 14 to carry out a process of printing the image data and then (ii) transmits the printing command to the web server section 35. The web server section 35 transmits, to the multifunction peripheral 10 via the communication section 31, (i) the image data that has been subjected to the image process and (ii) the printing command both received from the image processing apparatus 50 (S44).

The web browser section 22 of the multifunction peripheral 10, upon receipt of data from the control apparatus 30 (S15b), determines whether the received data is error screen data (S15c).

In the case where the web browser section 22 has determined that the received data is error screen data, the web browser section 22 causes the display section 12b to display an error screen (S15d), whereby the flow of the steps ends.

In the case where the web browser section 22 has determined that the received data is not error screen data (that is, the web browser section 22 has received image data and a printing command), the web browser section 22 transmits the received image data and printing command to the control application section 23. The control application section 23 then (i) activates the printing API 23c, (ii) creates a control command for causing the printing process responding to the printing command to be carried out, and (iii) transmits the control command to the device control section 21. The device control section 21, in accordance with this control command, controls the image forming section 14 to cause the image forming section 14 to carry out the process of printing an image represented by the image data received in S15 (S16), whereby the flow of the steps ends.

In each of the embodiments, each section (block) included in the multifunction peripheral 10, the control apparatus 30, and the image processing apparatus 50, particularly the control section 11 and/or image process section 15 of the multifunction peripheral 10, the control section 32 and/or image process section 34 of the control apparatus 30, and the control section 52 and/or image process section 54 of the image processing apparatus 50, may be realized by software by using a processor such as a CPU. In this case, the multifunction peripheral 10, the control apparatus 30, and the image processing apparatus 50 may each include: a CPU (central processing unit) for executing a program for realizing functions of each section; a ROM (read only memory) that stores the program; a RAM (random access memory) that develops the program; a storage device (storage medium) such as a memory in which the program and various data are stored; and the like. In this case, the object of the present invention can be realized in such a manner that the multifunction peripheral 10, the control apparatus 30, and the image processing apparatus 50 are each provided with a computer-readable storage medium for storing program codes (such as executable program, intermediate code program, and source program) of control programs for a corresponding one of the multifunction peripheral 10, the control apparatus 30, and the image processing apparatus 50 which programs serve as software for realizing the functions, and a computer (alternatively, a CPU or an MPU) reads out and executes the program codes stored in the storage medium.

Examples of the storage medium include (i) a tape such as a magnetic tape and a cassette tape, (ii) a disk including a magnetic disk such as a floppy (registered trademark) disk and a hard disk, and an optical disk such as a CD-ROM, an MO, an MD, a DVD, and a CD-R, (iii) a card such as an IC card (including a memory card) and an optical card, and (iv) a semiconductor memory realized by a mask ROM, an EPROM, an EEPROM, a flash ROM, and the like.

The multifunction peripheral 10, the control apparatus 30, and the image processing apparatus 50 can be connected to a communication network, via which the program codes can be supplied to the multifunction peripheral 10, the control apparatus 30, and the image processing apparatus 50. Such a communication network is not particularly limited in configuration. Examples of the communication network includes the Internet, an intranet, an extranet, a LAN, ISDN, VAN, a CATV communications network, a virtual private network, a telephone network, a mobile telecommunications network, and a satellite communication network. A transmission medium of which a communication network is composed is not particularly limited. Examples of the transmission medium includes (i) a wired transmission medium such as IEEE1394, USB, power-line carrier, cable TV line, telephone line, and ADSL line and (ii) a wireless transmission medium such as an infrared communication system such as IrDA and a remote controller, Bluetooth (registered trademark), 802.11 wireless network, HDR, mobile telephone network, satellite line, and digital terrestrial network. Note that the present invention can also be realized in the form of a computer data signal in which the program codes are embodied by an electronic transmission and which is embedded in carrier waves.

Each block of the multifunction peripheral 10, the control apparatus 30, and the image processing apparatus 50 is not necessarily realized by software, but may be realized by hardware logic. Further, each block of the multifunction peripheral 10, the control apparatus 30, and the image processing apparatus 50 may be realized by a combination of hardware carrying out some of the processes and computing means controlling the hardware and executing program code for the other processes.

An image data processing system of the present invention includes: a multifunction peripheral including: an image scanning section for reading a document to obtain image data of the document; an internal image process section for carrying out an image process with respect to image data; and an image data output process section for carrying out a process of outputting image data; and one or more image processing apparatuses each including: an external image process section for carrying out an image process with respect to image data, the multifunction peripheral and the one or more image processing apparatuses being communicably connected to one another over a communications network, the image data processing system carrying out a complex process during which: the image scanning section obtains image data of a document; at least one of the internal image process section and the external image process section carries out an image process with respect to the image data obtained by the image scanning section; and the image data output process section carries out a process of outputting the image data that has been subjected to the image process by the at least one of the internal image process section and the external image process section, the image data processing system further including: a control apparatus communicably connected to the multifunction peripheral over the communications network, the control apparatus including: a complex process control section for controlling respective operations of the image scanning section, the at least one of the internal image process section and the external image process section, and the image data output process section during the complex process, the multifunction peripheral further including: an instruction input section for accepting, from a user, (i) a first instruction to select content of the image process to be carried out with respect to the image data during the complex process and (ii) a second instruction to start the complex process, the control apparatus further including: a storage section storing image processing function information including (i) information on content of an image process that the internal image process section is capable of carrying out and (ii) information on content of an image process that the external image process section is capable of carrying out, the multifunction peripheral, upon receipt of the first instruction and the second instruction from the user, transmitting, to the control apparatus, (i) process content information indicative of the selected image process content and (ii) a request to start the complex process, the complex process control section, upon receipt of the request and the process content information from the multifunction peripheral, (i) causing the image scanning section to obtain image data of a document, (ii) on a basis of the process content information and the image processing function information, detecting, from among the internal image process section and the respective external image process sections of the one or more image processing apparatuses, an image process section that is capable of carrying out a first image process corresponding to the image process content selected by the user, and (iii) causing the detected image process section to carry out the first image process with respect to the image data obtained by the image scanning section.

According to the above arrangement, the multifunction peripheral, upon acceptance, from the user, of (i) an instruction to select content of an image process and (ii) an instruction to start a complex process, transmits, to the control apparatus, (i) process content information indicative of the selected image process content and (ii) a request to start a complex process. Further, the control apparatus includes a storage section that stores image processing function information including (i) information on the content of an image process that the internal image process section is capable of carrying out and (ii) information on the content of an image process that the external image process section is capable of carrying out. The control apparatus, upon receipt of the complex process start request and the process content information from the multifunction peripheral, (i) causes the mage scanning section to obtain image data of a document, (ii) on the basis of the process content information and the image processing function information, detects, from among the internal image process section and the respective external image process sections, an image process section that is capable of carrying out an image process corresponding to the image process content selected by the user, (iii) causes the detected image process section to carry out, with respect to the image data obtained by the image scanning section, the image process corresponding to the image process content selected by the user, and (iv) causes the image data output process section to carry out a process of outputting the image data that has been subjected to the image process. With this arrangement, even in the case where, for instance, there has been a change (for example, update, addition, and elimination) to the image processing functions that can be performed by the image processing apparatus, such a change merely requires updating the image processing function information stored in the control apparatus, and does not require updating information registered in the multifunction peripheral. The above arrangement thus makes it possible to easily use, at the multifunction peripheral, an up-to-date image processing function that can be performed by the image processing apparatus.

The image data processing system may be arranged such that the output process carried out by the image data output process section is either one (1) or a combination of two or more of a printing process of printing an image represented by image data, a transmission process of transmitting image data to another apparatus communicably connected to the multifunction peripheral, a filing process of causing either (i) storage means included in the multifunction peripheral or (ii) storage means communicably connected to the multifunction peripheral to store image data, and a displaying process of causing either (i) display means included in the multifunction peripheral or (ii) display means communicably connected to the multifunction peripheral to display an image represented by image data.

The above arrangement allows the user to easily use, at the multifunction peripheral, an up-to-date image processing function that can be carried out by the image processing apparatus for a printing process, a transmission process, a filing process, a displaying process, or a process combining any of the above.

The image data processing system may be arranged such that the image processing function information includes (i) information on a type of the image process that the internal image process section is capable of carrying out and (ii) information on a type of the image process that the external image process section is capable of carrying out; and the complex process control section detects, in correspondence with a type of an image process selected by the user, an image process section that is capable of carrying out the selected image process.

The above arrangement makes it possible to appropriately detect, in correspondence with the type of an image process selected by the user, an image process section that is to carry out the selected image process.

The image data processing system may be arranged such that the multifunction peripheral further includes a display section for displaying information to be presented to the user; and the complex process control section (i) transmits, to the multifunction peripheral, screen data representing an operation screen on which the user provides the first instruction and the second instruction and (ii) causes the display section to display the operation screen.

The above arrangement allows the control apparatus to control an operation screen to be displayed by the display section of the multifunction peripheral. Thus, even in the case where there has been a change to the content of image processes that can be carried out by image process sections included in the image data processing system, the content of such a change can be appropriately reflected on the operation screen.

The image data processing system may be arranged such that the complex process control section, (i) after transmitting the output preparation completion notification and (ii) upon receipt, from the multifunction peripheral or the another apparatus, of an instruction to start the output process, carries out a user authentication process for a user who has provided the instruction to start the output process.

The above arrangement makes it possible to, even in the case where the user has been, after carrying out an image scanning process, away from the multifunction peripheral before carrying out an output process, prevent a third person from obtaining the result of the output process. Consequently, even in the case where, for instance, an image process by the image processing apparatus takes a long time, the user does not necessarily have to continue to wait for completion of the image process at the multifunction peripheral. The above arrangement can thus improve the user's convenience.

The image data processing system may further include: a print job managing server for storing the image data that has been subjected to the image process by the image processing apparatus, wherein: the complex process control section transmits, to the print job managing server, (i) the image data that has been subjected to the image process by the image processing apparatus and (ii) an output process command for causing a process of outputting the image data to be carried out by either the multifunction peripheral or another apparatus having a function of carrying out the output process; and the print job managing server (i) stores the image data and the output process command and (ii) upon receipt, from the user via the multifunction peripheral or the another apparatus, of a request to transmit the image data and the output process command, transmits, in response to the request, the image data and the output process command to either the multifunction peripheral or the another apparatus.

The above arrangement allows the user to, after carrying out an image scanning process, carry out an output process at any timing with use of (i) a multifunction peripheral or another apparatus having an output process function each connected to the communications network.

The image data processing system may be arranged such that the complex process control section, in a case where it has achieved a state in which it is capable of transmitting, to the multifunction peripheral, the image data that has been subjected to the image process by the image processing apparatus, transmits, to a destination specified in advance, an output preparation completion notification indicating that the complex process control section has completed preparation of the output process.

The above arrangement allows the user to learn, by checking the output preparation completion notification transmitted to the above destination, that preparation of the output process has been completed.

The image data processing system may be arranged such that the multifunction peripheral further includes: a display section for displaying information to be presented to the user; and an image storage section storing screen data representing an operation screen on which the user provides (i) the first instruction and (ii) the second instruction; and in a case where the image storage section stores the screen data representing the operation screen, the multifunction peripheral (i) reads the screen data from the image storage section and (ii) causes the display section to display the operation screen, and in a case where the image storage section does not store the screen data representing the operation screen, the multifunction peripheral (i) obtains the screen data from the control apparatus, (ii) causes the display section to display the operation screen, and (iii) causes the image storage section to store the screen data.

The above arrangement makes it possible to, in the case where the image storage section stores screen data representing an operation screen, (i) read the screen data from the image storage section and (ii) cause the display section to display the operation screen. The above arrangement can thus reduce the time needed to display an operation screen, and improve the user's convenience.

The image data processing system may be arranged such that the multifunction peripheral transmits, in addition to the process content information and the request, user identification information for the user of the multifunction peripheral to the control apparatus; the control apparatus stores, for each of the one or more image processing apparatuses, user identification information for a user who is authorized to use the external image process section of the each of the one or more image processing apparatuses; the complex process control section selects, from a group of (i) the internal image process section and (ii) among the respective external image process sections, an external image process section that the user is authorized to use, the image process section that is to be caused to carry out the first image process; and in a case where the group includes no image process section that is capable of carrying out the first image process, the complex process control section stops the carrying out of the complex process corresponding to the image process content selected by the user.

The above arrangement makes it possible to set an external image process section available for each user.

The image data processing system may be arranged such that the control apparatus stores information on priority of, among the respective external image process sections of the one or more image processing apparatuses, external image process sections that carry out a similar image process; the control apparatus, in a case where (i) the internal image process section is incapable of carrying out the first image process and (ii) there are a plurality of external image process sections that are capable of carrying out the first image process and that the user is authorized to use, (i) selects an external image process section from among the plurality of external image process sections in accordance with the priority and (ii) causes the selected external image process section to carry out the first image process with respect to the image data obtained by the image scanning section.

The above arrangement makes it possible to, in the case where there are a plurality of external image process sections that the user can use, select, in accordance with priority set in advance, an image process section that is to carry out an image process.

The image data processing system may be arranged such that one of the one or more image processing apparatuses is included in the control apparatus.

The above arrangement makes it possible to easily use, at the multifunction peripheral, (i) an image processing function of the image process section included in the multifunction peripheral and (ii) an image processing function that can be carried out by the image processing apparatus included in the control apparatus.

INDUSTRIAL APPLICABILITY

The present invention is applicable to an image data processing system in which a multifunction peripheral and an image processing apparatus communicably connected to each other over a communications network cooperate with each other to carry out a copying operation.

REFERENCE SIGNS LIST

1 image data processing system
1*b* image data processing system 10 multifunction peripheral
11 control section
12 operation section
12a input section (instruction input section)
12b display section
13 image scanning section
14 image forming section
15 image process section (internal image process section)
16 communication section
21 device control section
22 web browser section
23 control application section
30 control apparatus (image processing apparatus)
31 communication section
32 control section (complex process control section)
33 storage section
34 image process section (external image process section)
35 web server section
36 external application section
37 screen information storage section
38 control information storage section
39 image processing information storage section
50 image processing apparatus
51 communication section
52 control section
53 storage section
54 image process section (external image process section)
70 print job managing server
71 communication section
72 control section
73 storage section
100 communications network

The invention claimed is:

1. An image data processing system comprising:
a multifunction peripheral including:
an image scanning section for reading a document to obtain image data of the document;
an internal image process section for carrying out an image process with respect to image data; and
an image data output process section for carrying out a process of outputting image data; and
one or more image processing apparatuses each including:
an external image process section for carrying out an image process with respect to image data,
the multifunction peripheral and the one or more image processing apparatuses being communicably connected to one another over a communications network,
the image data processing system carrying out a complex process during which:
the image scanning section obtains image data of a document;
at least one of the internal image process section and the external image process section carries out an image process with respect to the image data obtained by the image scanning section; and
the image data output process section carries out a process of outputting the image data that has been subjected to the image process by the at least one of the internal image process section and the external image process section,
the image data processing system further comprising:
a control apparatus communicably connected to the multifunction peripheral over the communications network, the control apparatus including:
a complex process control section for controlling respective operations of the image scanning section, the at least one of the internal image process section and the external image process section, and the image data output process section during the complex process,
the multifunction peripheral further including:
an instruction input section for accepting, from a user, (i) a first instruction to select content of the image process to be carried out with respect to the image data during the complex process and (ii) a second instruction to start the complex process,
the control apparatus further including:
a storage section storing image processing function information including (i) information on content of an image process that the internal image process section is capable of carrying out and (ii) information on content of an image process that the external image process section is capable of carrying out,
the multifunction peripheral, upon receipt of the first instruction and the second instruction from the user, transmitting, to the control apparatus, (i) process content information indicative of the selected image process content and (ii) a request to start the complex process,
the complex process control section, upon receipt of the request and the process content information from the multifunction peripheral, (i) causing the image scanning section to obtain image data of a document, (ii) on a basis of the process content information and the image processing function information, detecting, from among the internal image process section and the respective external image process sections of the one or more image processing apparatuses, an image process section that is capable of carrying out a first image process corresponding to the image process content selected by the user, and (iii) causing the detected image process section to carry out the first image process with respect to the image data obtained by the image scanning section.

2. The image data processing system according to claim 1, wherein:
the output process carried out by the image data output process section is either one (1) or a combination of two or more of
a printing process of printing an image represented by image data,
a transmission process of transmitting image data to another apparatus communicably connected to the multifunction peripheral,
a filing process of causing either (i) storage means included in the multifunction peripheral or (ii) storage means communicably connected to the multifunction peripheral to store image data, and
a displaying process of causing either (i) display means included in the multifunction peripheral or (ii) display means communicably connected to the multifunction peripheral to display an image represented by image data.

3. The image data processing system according to claim 1, wherein:
the image processing function information includes (i) information on a type of the image process that the internal image process section is capable of carrying out and (ii) information on a type of the image process that the external image process section is capable of carrying out; and
the complex process control section detects, in correspondence with a type of an image process selected by the user, an image process section that is capable of carrying out the selected image process.

4. The image data processing system according to claim 1, wherein:
- the multifunction peripheral further includes a display section for displaying information to be presented to the user; and
- the complex process control section (i) transmits, to the multifunction peripheral, screen data representing an operation screen on which the user provides the first instruction and the second instruction and (ii) causes the display section to display the operation screen.

5. The image data processing system according to claim 1, wherein:
- the multifunction peripheral transmits, in addition to the process content information and the request, user identification information for the user of the multifunction peripheral to the control apparatus;
- the control apparatus stores, for each of the one or more image processing apparatuses, user identification information for a user who is authorized to use the external image process section of said each of the one or more image processing apparatuses;
- the complex process control section selects, from a group of (i) the internal image process section and (ii) among the respective external image process sections, an external image process section that the user is authorized to use, the image process section that is to be caused to carry out the first image process; and
- in a case where the group includes no image process section that is capable of carrying out the first image process, the complex process control section stops the carrying out of the complex process corresponding to the image process content selected by the user.

* * * * *